US012447758B2

(12) United States Patent
Fukasawa

(10) Patent No.: US 12,447,758 B2
(45) Date of Patent: Oct. 21, 2025

(54) PRINTING APPARATUS

(71) Applicant: SEIKO EPSON CORPORATION, Tokyo (JP)

(72) Inventor: Koki Fukasawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 185 days.

(21) Appl. No.: 18/341,684

(22) Filed: Jun. 26, 2023

(65) Prior Publication Data

US 2023/0415498 A1 Dec. 28, 2023

(30) Foreign Application Priority Data

Jun. 28, 2022 (JP) ................................ 2022-103979

(51) Int. Cl.
*B41J 11/00* (2006.01)
*B41J 29/393* (2006.01)

(52) U.S. Cl.
CPC .......... *B41J 11/0085* (2013.01); *B41J 11/007* (2013.01); *B41J 11/009* (2013.01); *B41J 29/393* (2013.01)

(58) Field of Classification Search
CPC ..... B41J 11/0085; B41J 11/007; B41J 11/009; B41J 29/393
USPC ........................................................ 347/104
See application file for complete search history.

(56) References Cited

U.S. PATENT DOCUMENTS 11,318,761 B2 * 5/2022 Asamoto .............. B41J 11/0021
2010/0171782 A1 * 7/2010 Kado ..................... B41J 29/377 347/16

FOREIGN PATENT DOCUMENTS

JP 2009-143147 A 7/2009

* cited by examiner

*Primary Examiner* — Sharon Polk
(74) *Attorney, Agent, or Firm* — WORKMAN NYDEGGER

(57) ABSTRACT

The printing apparatus includes a transport unit, a printing unit, a support portion, and a suction force applying unit. The transport unit is configured to apply a transport force to the printing medium and transport the printing medium. The printing unit is configured to perform printing on the printing medium transported. The support portion includes a support face configured to support the printing medium at a position upstream of the transport unit in a transport direction in which the transport unit transports the printing medium. The suction force applying unit is configured to apply, to the printing medium transported along the support face, a suction force attracting the printing medium to the support face, thereby generating a surface pressure based on the suction force between the printing medium and the support face.

18 Claims, 6 Drawing Sheets

RD
| MEDIUM TYPE | SUCTION FORCE |
|---|---|
| MEDIUM A | a |
| MEDIUM B | b |
| MEDIUM C | c |
| ⋮ | ⋮ |
FIG. 6
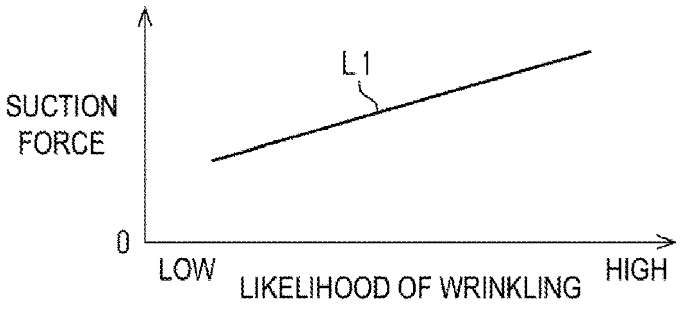
FIG. 7
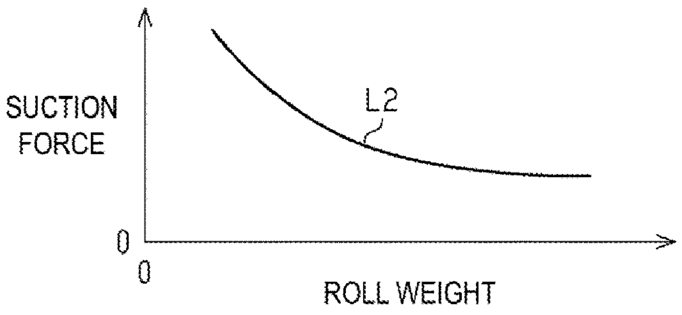
FIG. 8
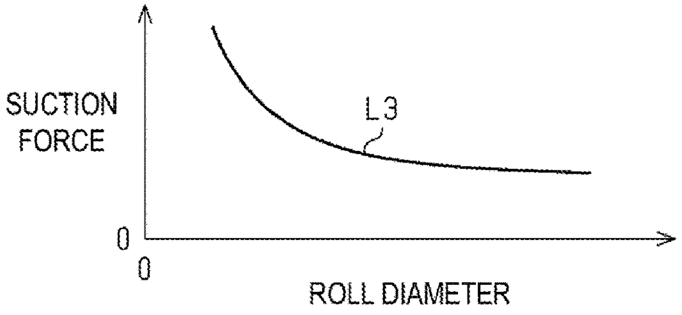
FIG. 9

PRINTING APPARATUS

The present application is based on, and claims priority from JP Application Serial Number 2022-103979, filed Jun. 28, 2022, the disclosure of which is hereby incorporated by reference herein in its entirety.

BACKGROUND

1. Technical Field

The present disclosure relates to a printing apparatus including a transport unit that transports a printing medium, and a printing unit that performs printing on the printing medium.

2. Related Art

JP-A-2009-143147 discloses a printing apparatus that performs printing on a printing medium such as roll paper. This printing apparatus includes a tension applying mechanism that applies tension to a sheet before printing during transport. The tension is applied to the printing medium in a path between a feeding mechanism that feeds the printing medium from a roll and a winding mechanism that winds the printing medium after printing around the roll. With tension applied to the printing medium fed to the transport unit, the occurrence of wrinkling in the printing medium before transport to the transport unit is suppressed. Note that, in this type of printing apparatus, a configuration in which an intermediate roller is provided in the middle of a path between a feeding unit that feeds the printing medium (roll paper) from a roll and a transport unit is also known. In this printing apparatus, a feeding operation of the transport unit and a feeding operation of the intermediate roller are controlled, thereby applying an appropriate tension to a portion of the printing medium between the transport unit and the intermediate roller.

However, in the printing apparatus described in JP-A-2009-143147, the tension applying mechanism for applying tension to the sheet has a complex configuration, and thus the mechanism has a large size, which leads to an increase in the size of the apparatus. Further, the tension applying mechanism is attached to a periphery of the roll, deteriorating workability when a user attaches or detaches the roll to or from the feeding unit. Furthermore, in the printing apparatus including the intermediate roller, when the user performs a predetermined task such as a setting task of setting the printing medium before the start of printing or a removal task of removing the printing medium when a jam occurs, the intermediate roller is an obstacle, deteriorating workability. Moreover, a release mechanism for moving the intermediate roller to a position away from the printing medium during the setting task and the removal task is required, making the mechanism relatively complex. With an increase in mechanism complexity and size, the mechanism itself becomes heavy, making it necessary to increase a rigidity of an apparatus frame for supporting the mechanism, which also increases the size of the apparatus. Therefore, there is a demand for a printing apparatus that can apply tension to a printing medium before the printing medium is fed to a transport unit without deterioration in workability and with a relatively simple configuration.

SUMMARY

A printing apparatus configured to solve the problems described above includes a transport unit, a printing unit, a support portion, and a suction force applying unit. The transport unit is configured to apply a transport force to a printing medium and transport the printing medium. The printing unit is configured to perform printing on the printing medium transported. The support portion includes a support face configured to support the printing medium at a position upstream of the transport unit in a transport direction in which the transport unit transports the printing medium. The suction force applying unit is configured to apply, to the printing medium transported along the support face, a suction force attracting the printing medium to the support face, thereby generating a surface pressure based on the suction force between the printing medium and the support face.

BRIEF DESCRIPTION OF THE DRAWINGS

FIG. 6 is a table of reference data illustrating a correspondence relationship between a medium type and a suction force.

FIG. 7 is a graph showing a relationship between likelihood of wrinkling in a medium and the suction force.

FIG. 8 is a graph showing a relationship between a roll weight and the suction force.

FIG. 9 is a graph showing a relationship between a roll diameter and the suction force.

DESCRIPTION OF EXEMPLARY EMBODIMENTS

An exemplary embodiment of a printing apparatus will be described below with reference to the accompanying drawings.

Figure 1:
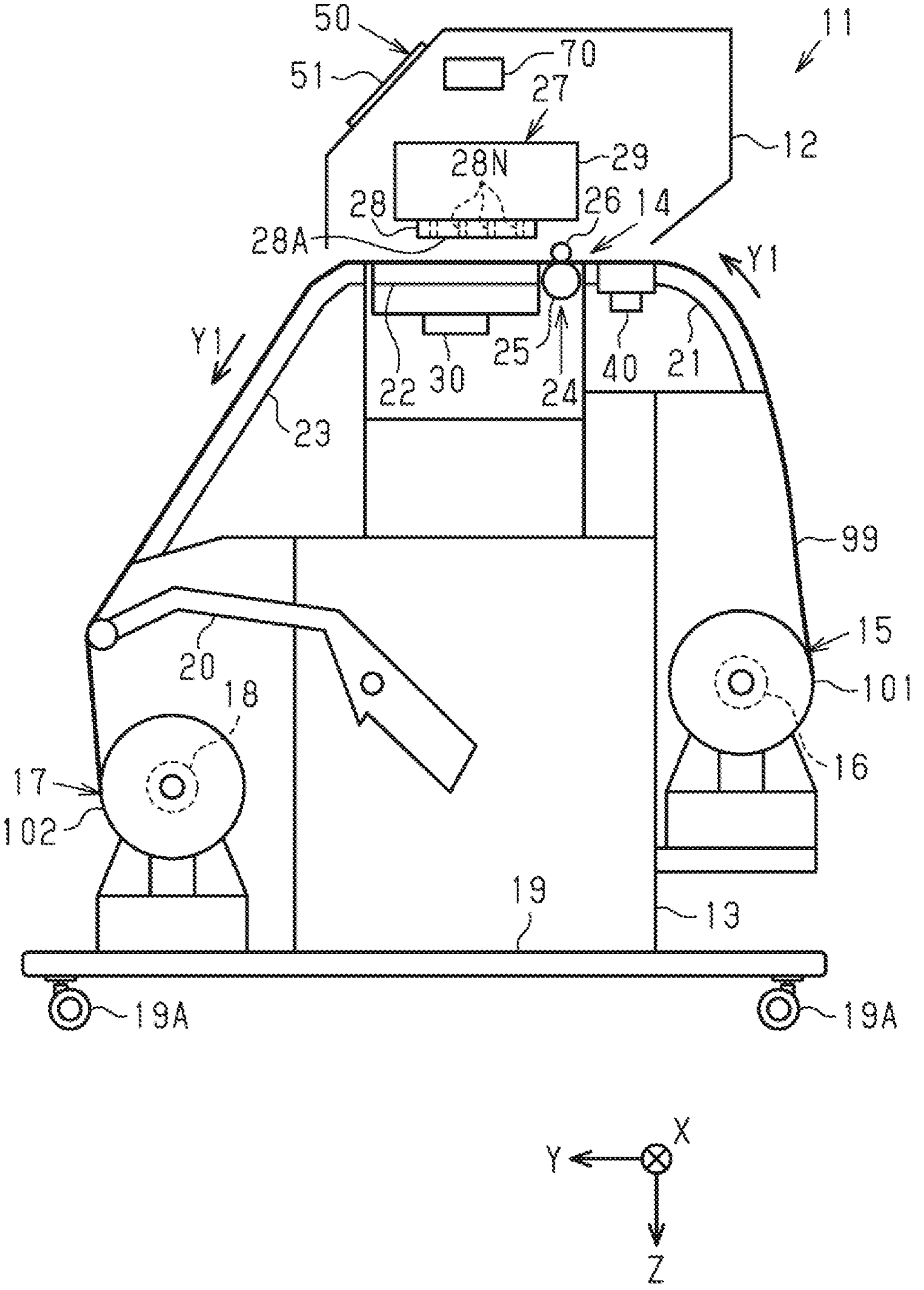
FIG. 1 is a schematic side sectional view of a printing apparatus according to an exemplary embodiment.

A printing apparatus 11 illustrated in FIG. 1 is placed on a horizontal surface, and a width direction and a depth direction are substantially horizontal. An X-axis, a Y-axis, and a Z-axis are coordinate axes parallel to the width direction, the depth direction, and a vertical direction, respectively. In view of a printing medium 99 (hereinafter, simply referred to as "medium 99") transported during printing, the X-axis is parallel to a width direction of the printing medium 99 and thus, in the following, the X-axis is also referred to as a width direction X. A transport direction in which the printing medium 99 is transported at a printing position where printing is performed on the printing medium 99 is parallel to the Y-axis, and thus is also referred to as a transport direction Y. A direction in which the printing medium 99 is transported along the transport path is also referred to as a transport direction Y1. The transport direction Y1 changes depending on a position on the transport path. Note that the width direction X is a direction intersecting (orthogonal to, for example) the transport direction Y1.

As illustrated in FIG. 1, the printing apparatus 11 is, for example, an inkjet-type printer configured to print characters, images, or the like onto the medium 99, such as a sheet, by ejecting a liquid such as ink onto the medium 99. The printing apparatus 11 includes a housing 12 and a base 13 that supports the housing 12.

As illustrated in FIG. 1, the printing apparatus 11 includes a transport unit 14 that transports the medium 99. The transport unit 14 includes a transport roller pair 24. The printing apparatus 11 includes a feeding unit 15 that supports a roll 101 around which the medium 99 is wound into a roll shape at a position upstream of the transport unit 14 in the transport direction Y1, and feeds the medium 99 from the roll 101. The transport unit 14 applies a transport force to the medium 99 fed from the feeding unit 15 and transports the medium 99.

The transport unit 14 of this exemplary embodiment is provided inside the housing 12 and transports the medium 99 along a predetermined transport path. The printing apparatus 11 includes the feeding unit 15 capable of supporting the roll 101 around which the medium 99, unprinted, is wound. The feeding unit 15 supports the roll 101 in a rotatable state. The feeding unit 15 includes a feeding motor 16 driven when the roll 101 is rotated in a feeding direction. The transport unit 14 transports the medium 99 long in shape and fed from the roll 101 by the feeding unit 15. Note that, in this exemplary embodiment, the transport direction Y1 of the medium 99 is a direction in which the medium 99 fed from the roll 101 is transported along the transport path, and varies depending on the position on the transport path.

The printing apparatus 11 includes a printing unit 27 that performs printing on the medium 99 transported. The printing unit 27 includes an ejecting unit 28 that ejects liquid onto the medium 99 transported by the transport unit 14. The printing apparatus 11 of this exemplary embodiment is a serial printer in which the ejecting unit 28 scans the medium 99 in a scanning direction X. The printing unit 27 includes a carriage 29 scanned in the scanning direction X intersecting the transport direction Y1 at a position above the medium 99 transported, and the ejecting unit 28 provided at a lower portion of the carriage 29. The ejecting unit 28 is an ejection head capable of ejecting liquid from a nozzle 28N. The ejecting unit 28 and the carriage 29 are disposed inside the housing 12. Note that the printing apparatus 11 is not limited to a serial printer, and may be a line printer in which the ejecting unit 28 includes a large number of nozzles capable of ejecting liquid all at once in a range across the width direction of the medium 99. Note that the scanning direction X is a direction intersecting the transport direction Y1 and is equivalent to the width direction X.

The printing apparatus 11 includes a support 22 including a support face 22A (refer to FIG. 2) that supports the medium 99. In this exemplary embodiment, at a printing position facing the ejecting unit 28, the medium 99 is supported by the support 22 and transported in a direction along the Y-axis. For this reason, the transport direction of the medium 99 at the printing position is also referred to as the transport direction Y.

As illustrated in FIG. 1, the printing apparatus 11 includes a winding unit 17 that winds, as a roll 102, the medium 99 on which characters or images have been printed by ejection of the liquid. The winding unit 17 includes a winding motor 18 serving as a driving source for winding the roll 102. The winding unit 17 is supported on a moving base 19 that supports the base 13. The moving base 19 is provided with a plurality of casters 19A for moving the printing apparatus 11.

The printing apparatus 11 includes a tension bar 20 that applies tension to the medium 99 before being wound by the winding unit 17. A length of the medium 99 between the winding unit 17 and the transport unit 14 changes in accordance with a difference between a transport amount by which the transport unit 14 transports the medium 99 and a winding amount by which the winding unit 17 winds the medium 99. The tension bar 20 comes into contact with the medium 99 between the winding unit 17 and the transport unit 14 and is displaced while applying a force due to its own weight to the medium 99, thereby applying an appropriate tension to the medium 99.

The printing apparatus 11 includes, as an example of a support portion, an upstream support portion 21, the support 22, and a downstream support portion 23 that form the transport path of the medium 99. The upstream support portion 21 supports the medium 99 at a position upstream of the transport unit 14 in the transport direction Y1 in which the transport unit 14 transports the medium 99.

The upstream support portion 21, the support 22, and the downstream support portion 23 support the medium 99 transported along the transport path between the feeding unit 15 and the winding unit 17. The upstream support portion 21, the support 22, and the downstream support portion 23 are disposed in this order on the transport path, from upstream to downstream. The upstream support portion 21 constitutes an upstream portion of the transport path and supports the medium 99 in a range from the feeding unit 15 to the transport unit 14. The support 22 constitutes a midstream portion of the transport path, and supports the medium 99 in a range facing a scanning region of the ejecting unit 28 downstream of the transport unit 14. The downstream support portion 23 constitutes a downstream portion of the transport path, and supports the medium 99 in a post-printing portion after the liquid ejected by the ejecting unit 28 is adhered.

In the example illustrated in FIG. 1, the support 22 is horizontally disposed inside the housing 12. On both sides of the support 22 in the transport direction Y1, the upstream support portion 21 (hereinafter, also simply referred to as "support portion 21") and the downstream support portion 23 are disposed in an inclined state, increasing in height as a distance to the support 22 decreases.

In this exemplary embodiment, the feeding unit 15 is positioned below the transport unit 14 and the support portion 21 in the vertical direction Z. That is, a height of the feeding unit 15 is lower than respective heights of the transport unit 14 and the support portion 21. Therefore, in this exemplary embodiment, a support face 21A of the support portion 21 is a curved surface. The support portion 21 includes the support face 21A formed of an upwardly convex curved surface, increasing in a height position in the vertical direction Z as a distance to the support 22 decreases.

As illustrated in FIG. 1, the transport unit 14 includes a driving roller 25 and a driven roller 26. The driving roller 25 and the driven roller 26 transport the medium 99 by rotating with the medium 99 in a nipped state sandwiched therebetween. The driving roller 25 and the driven roller 26 are positioned upstream of the support 22 in the transport direction Y, and feed the medium 99 onto the support 22. A transport motor 72 (refer to FIG. 5) serves as a driving source for the driving roller 25.

The printing apparatus 11 includes the ejecting unit 28 described above that ejects liquid onto the medium 99 supported by the support 22. The ejecting unit 28 is disposed at a position facing the support 22 inside the housing 12. Thus, the ejecting unit 28 ejects liquid onto a portion of the medium 99 supported by the support 22. The ejecting unit 28 includes a nozzle opening face 28A facing the support 22 and a large number of the nozzles 28N opening to the nozzle opening face 28N. While the carriage 29 moves in the scanning direction X, the ejecting unit 28 ejects liquid from the nozzles 28N toward the medium 99.

As illustrated in FIG. 1, the printing apparatus 11 may include a suction mechanism 30 that suctions, attracting the medium 99 to the support 22. The suction mechanism 30 is assembled to, for example, a lower portion of the support 22. The support 22 includes one or a plurality of suction holes 32 (refer to FIG. 2) that open to a surface supporting the medium 99. With the medium 99 adsorbed at the printing position facing the ejecting unit 28 on the support 22, floating and wrinkling of the medium 99 at the printing position are suppressed.

As illustrated in FIG. 1, the printing apparatus 11 includes a suction force applying unit 40 that applies, to the medium 99 transported along the support face 21A, a suction force attracting the medium 99 to the support face 21A, thereby generating a surface pressure based on the suction force between the medium 99 and the support face 21A. The suction force applying unit 40 is assembled to a lower portion of the support portion 21, for example.

The suction force applying unit 40 generates the suction force attracting the medium 99 to the support portion 21 by generating a negative pressure. The medium 99 is adsorbed to the support portion 21 at a predetermined surface pressure. Accordingly, floating and wrinkling are less likely to occur in a portion of the medium 99 before the medium 99 is transported to the transport roller pair 24.

Note that a heater (not illustrated) and a temperature sensor (not illustrated) that detects a heating temperature may be attached to back faces of the upstream support portion 21, the downstream support portion 23, and the support 22. The heater may be, for example, a linear heater wired in a predetermined path on the back faces of the upstream support portion 21, the downstream support portion 23, and the support 22.

Further, an operating panel 50 including a display unit 51 is provided on an outer face of the housing 12. The display unit 51 displays various menu screens, a screen for inputting printing condition information, various messages to the user, and the like.

Further, the printing apparatus 11 includes a control unit 70 inside the housing 12. The control unit 70 controls the transport unit 14, the feeding unit 15, the winding unit 17, the ejecting unit 28, the carriage 29, the display unit 51, and the like. Note that the printing apparatus 11 includes a humidity detector 60 (refer to FIG. 5) that detects humidity around the apparatus or inside the housing 12. The control unit 70 determines the suction force to be applied to the medium 99 by the suction force applying unit 40 on the basis of one or a plurality of parameters. The humidity information may be used as one parameter.

Configuration of Suction Mechanism 30 and Suction Force Applying Unit 40

Figure 2:
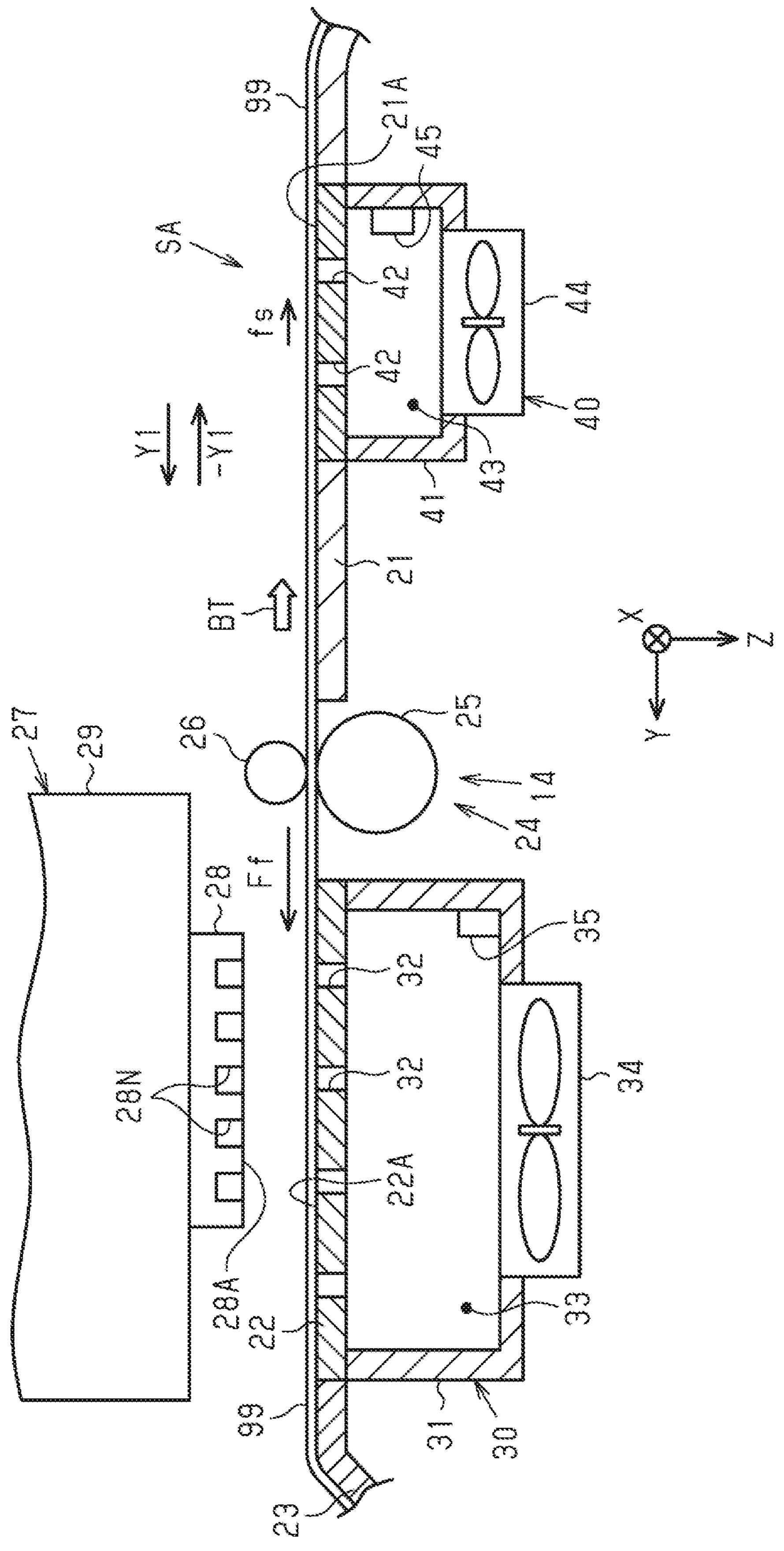
FIG. 2 is a schematic side sectional view illustrating an area around a transport roller pair of the printing apparatus.

Next, a detailed configuration of the suction mechanism and the suction force applying unit 40 will be described with reference to FIG. 2. As illustrated in FIG. 2, the support 22 includes the suction holes 32 that open to the support face 22A that supports the medium 99. The suction mechanism 30 is disposed at a position (printing position) downstream of the transport unit 14 in the transport direction Y1, and generates a negative pressure for applying a suction force that suctions the medium 99 to the suction holes 32. The suction mechanism 30 includes a negative pressure chamber forming member 31 in which a first negative pressure chamber 33 is formed on a lower side of the support 22, and an exhaust fan 34 for exhausting air present inside the first negative pressure chamber 33. The negative pressure chamber forming member 31 is assembled to the lower portion of the support 22. The first negative pressure chamber 33 is surrounded and formed by the support 22 and the negative pressure chamber forming member 31.

The suction holes 32 pass through the support 22 and communicate with the first negative pressure chamber 33. The plurality of suction holes 32 communicating with the first negative pressure chamber 33 open to the support face 22A. Note that the suction holes 32 constitute a portion of the suction mechanism 30.

The suction mechanism 30 exhausts air present inside the negative pressure chamber 33 by the exhaust fan 34, thereby forming a negative pressure inside the first negative pressure chamber 33 and generating a suction airflow flowing into the suction holes 32 open to the support face 22A of the support 22. The medium 99 is adsorbed to the support face 22A with a predetermined suction force by the suction force of the suction air flow. Accordingly, the medium 99 transported along the support face 21A in a state of coming into contact with the support face 21A comes into contact with the support face 22A at a surface pressure corresponding to the suction force of the support face 21A. Accordingly, floating or the like of the medium 99 from the support face 22A at the printing position facing the ejecting unit 28 is suppressed.

In the printing apparatus 11, during printing in which images or the like are printed onto the medium 99, the suction mechanism 30 is driven when it is estimated that floating, wrinkling, or the like may occur in the medium 99. A first pressure sensor 35 for detecting pressure is provided inside the first negative pressure chamber 33. The control unit 70 controls the exhaust fan 34 on the basis of the detection pressure detected by the first pressure sensor 35 so that the pressure inside the first negative pressure chamber 33 becomes a set negative pressure value.

Further, as illustrated in FIG. 2, the suction force applying unit 40 is disposed at a position upstream of the transport unit 14 in the transport direction Y1 and applies a suction force to the medium 99. The suction force applying unit 40 applies the suction force to the medium 99 in the middle of the path upstream of the transport unit 14 in the transport direction Y1. The support portion 21 includes the support face 21A that supports the medium 99. The support portion 21 has one or a plurality of suction holes 42. In the example illustrated in FIG. 2, the support portion 21 includes a plurality of the suction holes 42 that open to the support face 21A. Note that the number of the suction holes 42 may be one as long as the suction force necessary for bringing the medium 99 into contact with the support face 21A at a predetermined surface pressure can be generated.

The suction force applying unit 40 generates a negative pressure for applying a suction force to the suction holes 42 for suctioning the medium 99. The suction force applying unit 40 includes a suction fan 44 that generates the negative pressure in the suction holes 42.

Specifically, as illustrated in FIG. 2, the suction force applying unit 40 includes a negative pressure chamber forming member 41 assembled at the lower portion of the support 22, and the suction fan 44 that sets a second negative pressure chamber 43 formed by the negative pressure chamber forming member 41 to the negative pressure. The second negative pressure chamber 43 is surrounded and formed by the support portion 21 and the negative pressure chamber forming member 41. The suction holes 42 pass through the support portion 21 and communicate with the second negative pressure chamber 43. The suction holes 42 communicating with the second negative pressure chamber 43 open to the support face 21A. The suction fan 44 discharges air present inside the second negative pressure chamber 43 to the outside, thereby setting a negative pressure inside the second negative pressure chamber 43 and generating negative pressure inside the suction holes 42. The portion of the medium 99 supported by the support face 21A is adsorbed to the support face 21A by the suction force due to the negative pressure from the plurality of suction holes 42.

In the printing apparatus 11, when floating and wrinkling occur in the medium 99 at a position upstream of the transport unit 14 in the transport direction Y1, the floating and wrinkling are nipped by (sandwiched between) the transport roller pair 24, forming a crease. A portion of the crease of the medium 99 causes printing failure. The suction force applying unit 40 has a function of eliminating floating and wrinkling by bringing the medium 99 into contact with the support face 21A at a surface pressure based on the suction force.

Here, as illustrated in FIG. 2, before being transported to the nipping position of the transport roller pair 24, the medium 99 receives a frictional force fs (refer to FIG. 2) based on the surface pressure corresponding to the suction force at a suction location SA. This frictional force fs is expressed by fs=μ*N, where N is a drag force applied from the support face 21A to the medium 99 that comes into contact with the support face 21A at a surface pressure based on the negative pressure from the suction holes 42, and p is a friction coefficient between the medium 99 being transported and the support face 21A. Here, the symbol "*" indicates a multiplication operator. The drag force N is approximated by a sum of a weight (dead weight) of the medium 99 and the suction force, and thus the frictional force fs has a value that increases as the suction force increases. Therefore, adjusting the suction force applied to the medium 99 by the suction force applying unit 40 adjusts the frictional force fs in a reverse transport direction −Y1 acting on the medium 99 during transport. Then, the frictional force fs in the reverse transport direction −Y1 acts on the medium 99 that receives a transport force Ff in the transport direction Y1 from the transport roller pair 24 at the suction location SA where the suction force applying unit 40 applies the suction force, thereby causing a back tension BT to act on a portion of the medium 99 between the suction location SA and the nip position of the transport roller pair 24. Then, a magnitude of this back tension BT is adjusted by the control unit 70 that controls the suction force of the suction force applying unit 40.

The control unit 70 drives the suction fan 44 when it is estimated that floating or wrinkling may occur in the medium 99 upstream of the transport unit 14 in the transport direction Y1 during printing. Thus, the medium 99 is adsorbed to the support face 21A at the suction location SA. A second pressure sensor 45 for detecting pressure is provided inside the second negative pressure chamber 43 illustrated in FIG. 2. The control unit 70 controls the suction force applying unit 40 on the basis of the detection pressure detected by the pressure sensor 45, causing the pressure inside the second negative pressure chamber 43 to reach a target negative pressure value. In this exemplary embodiment, a negative pressure acts on the suction holes 42 both during transport and during stoppage of the medium 99, applying a suction force to the medium 99 during transport and during stoppage in a direction of attraction to the support face 21A. The suction force that attracts the medium 99 to the support face 21A can suppress the occurrence of floating and wrinkling in the medium 99 and can eliminate or reduce wrinkling that temporarily occurs. Therefore, when it is estimated that that wrinkling or the like may occur in the medium 99, the control unit 70 drives the suction force applying unit 40 to suppress the occurrence of wrinkling or the like.

Here, the likelihood of wrinkling in the medium 99 depends on a medium type, which is the type of the medium 99, an environment surrounding the printing apparatus 11, and the like. Therefore, the control unit 70 adjusts the suction force applied to the medium 99 by the suction force applying unit 40 in accordance with factors such as the medium type and the environment. Note that a method of adjusting the suction force will be described below in detail.

Configuration of Support Portion 21

Figure 3:
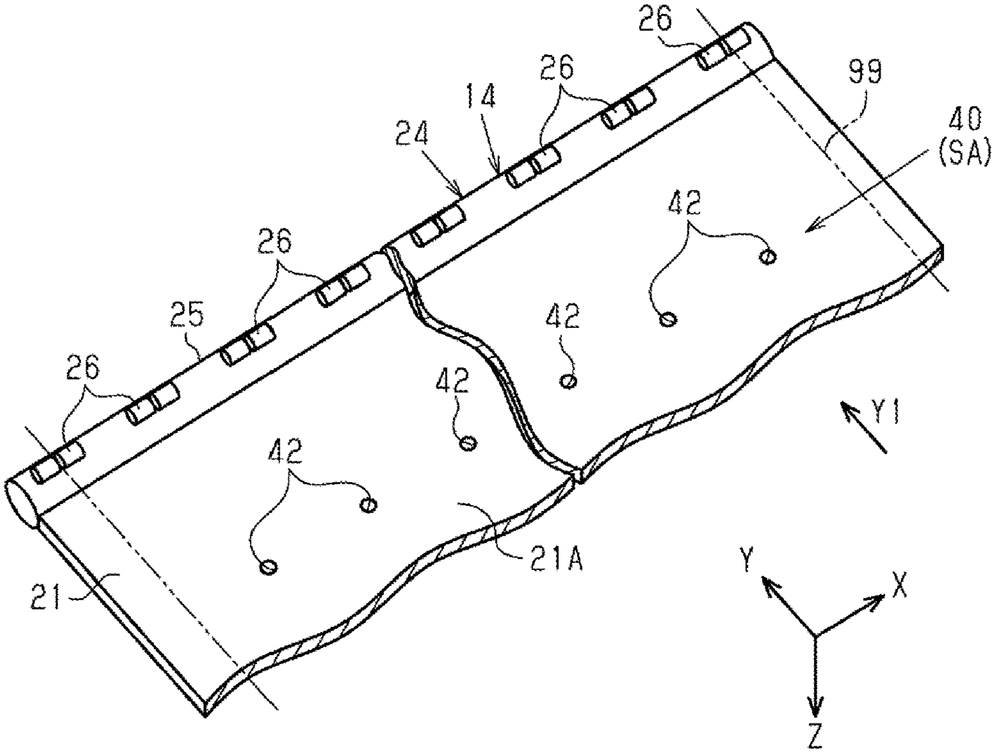
FIG. 3 is a partial perspective view illustrating a suction force applying unit and a transport roller pair according to a first example.
Figure 4:
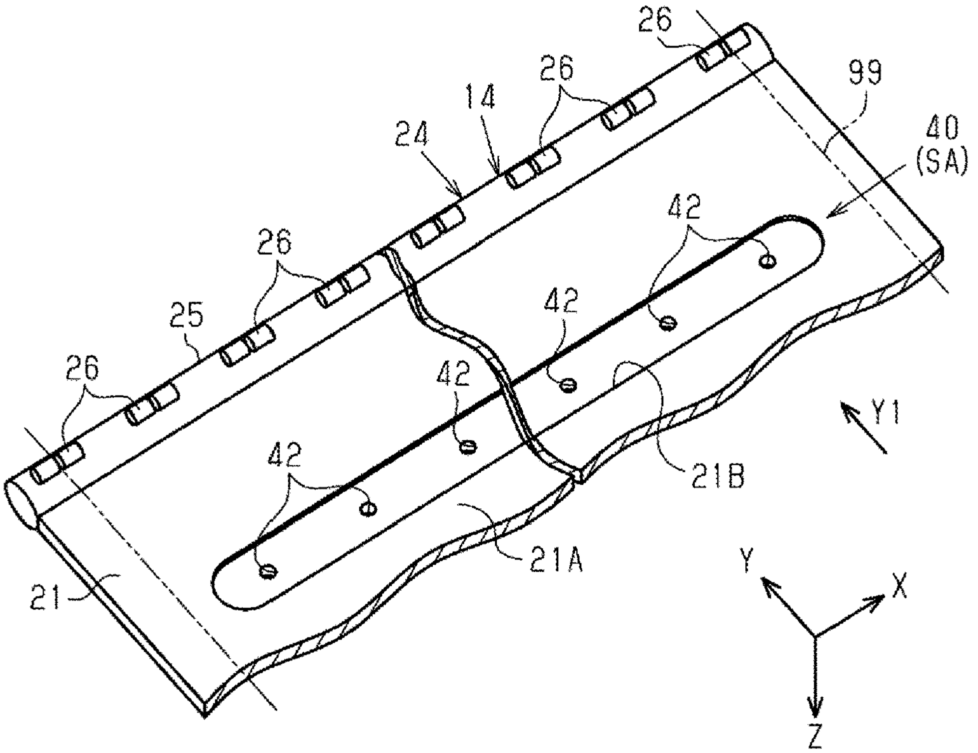
FIG. 4 is a partial perspective view illustrating the suction force applying unit and the transport roller pair according to a second example.

Next, a configuration of the support portion 21 will be described with reference to FIGS. 3 and 4. FIG. 3 illustrates a configuration of a first example of the support portion 21, and FIG. 4 illustrates a configuration of a second example of the support portion 21.

The support portion 21 includes the suction holes 42 in the support face 21A that supports the medium 99 to be transported. The suction force applying unit 40 described above and illustrated in FIG. 2 is assembled to the back face of the support portion 21. In the first example illustrated in FIG. 3, the suction holes 42 open to the support face 21A. In the second example illustrated in FIG. 4, the suction holes 42 open to a bottom face of a groove 21B recessed in the support face 21A. Note that, as illustrated in FIGS. 3 and 4, the transport roller pair 24 includes one driving roller 25 and a plurality of the driven rollers 26 disposed facing the driving roller 25 with a gap therebetween in the width direction X. The medium 99 is not nipped at a portion corresponding to between the driven rollers 26. Thus, floating and wrinkling are likely to occur in a location corresponding to a portion of the medium 99 that is not nipped in the width direction X. The wrinkling likely to occur is so-called longitudinal wrinkling extending in the transport direction Y1.

Configuration of Support Portion 21 of First Example

First, the configuration of the support portion 21 of the first example will be described with reference to FIG. 3.

As illustrated in FIG. 3, the plurality of suction holes 42 are formed in the support face 21A of the support portion 21, spaced apart in the width direction X intersecting the transport direction Y1 in which the medium 99 is transported. The suction holes 42 are, for example, circular holes.

The plurality of suction holes 42 are through-holes passing through the support portion 21, and open at substantially uniform positions in the width direction X in the support face 21A. For example, the plurality of suction holes 42 are positioned spaced apart at regular intervals in the width direction X. The plurality of suction holes 42 are formed across a range slightly narrower than a transport region in which the medium 99 having a maximum width indicated by a two dot chain line in FIG. 3 is transported. Note that FIG. 3 illustrates only one row of the plurality of suction holes 42. In this example, the suction holes 42 are in two rows, but may be in one row or a plurality of three or more rows. When passing across the row of the suction holes 42 (that is, the suction location SA), the medium 99 transported on the support face 21A is suctioned by the suction holes 42 with a predetermined suction force and thus comes into contact with the support face 21A at a predetermined surface pressure. At this time, the suction force received by the medium 99 is represented by a product of a sum of opening areas of the suction holes 42 blocked by the medium 99 and the negative pressure acting on the suction holes 42.

Configuration of Support Portion 21 of Second Example

Next, the configuration of the support portion 21 of the second example will be described with reference to FIG. 4.

As illustrated in FIG. 4, the support face 21A of the support portion 21 is provided with one or a plurality of the grooves 21B extending in the width direction X intersecting the transport direction Y1 in which the medium 99 is transported. In a case in which there are a plurality of the grooves 21B, the plurality of grooves 21B are positioned spaced apart in the transport direction Y1. The groove 21B is a recessed groove having a predetermined depth. The predetermined depth is, for example, a predetermined value within a range from 0.1 to 5 mm. The plurality of suction holes 42 are open to the bottom face of the groove 21B. The suction holes 42 are, for example, circular holes. The plurality of suction holes 42 are positioned spaced apart at regular intervals in the width direction X on the bottom face of the groove 21B, for example.

The plurality of suction holes 42 are through-holes passing through the support portion 21, and open at substantially uniform positions in the width direction X on the bottom face of the groove 21B. The plurality of suction holes 42 are open at positions on the bottom face of the groove 21B spaced part at regular intervals in a longitudinal direction of the groove 21B. The medium 99 having the maximum width indicated by the two dot chain line in FIG. 4 has a size that blocks the entire opening of the groove 21B. That is, when the medium 99 having the maximum width is transported along the support face 21A, the groove 21B is formed to have a region and a size blocked by the medium 99 having the maximum width. When the medium 99 is transported on the support face 21A, a substantially closed space surrounded by the medium 99 and the groove 21B is a negative pressure space. The medium 99 receives the suction force across an opening area of the groove 21B which is wide compared to the opening areas of the suction holes 42. That is, the suction force acting on the medium 99 is represented by the product of the opening area of the groove 21B blocked by the medium 99 and the negative pressure acting inside the groove 21B. Therefore, as compared with the configuration of the first example illustrated in FIG. 3, the medium 99 receives a suction force across a wide area, and thus is adsorbed to the support face 21A with a stronger force. As compared with the configuration in which the medium 99 receives the suction force at the portion of the suction holes 42 scattered on the support face 21A as illustrated in FIG. 3, in FIG. 4, the medium 99 receives the suction force via the opening area of the groove 21B elongated and continuous in the width direction X. For this reason, floating and wrinkling of the medium 99 are more readily suppressed.

As illustrated in FIG. 1, the suction force applying unit 40 is positioned closer to the transport unit 14 than a center of the path of the medium 99 between the feeding unit 15 and the transport unit 14 in the transport direction Y1. Accordingly, the suction holes 42 illustrated in FIG. 3 or the groove 21B illustrated in FIG. 4 are positioned closer to the transport unit 14 than the center of the path of the medium 99 between the feeding unit 15 and the transport unit 14 in the transport direction Y1. This is because, when the suction location SA is closer to the feeding unit 15 than the center of the path, even if floating and the like are temporarily eliminated by the suction force via the suction holes 42 or the groove 21B at the suction location SA, floating and the like reoccur more frequently before the medium 99 of that portion reaches the transport unit 14. Note that the suction location SA is not limited to such a position closer to the transport unit 14 than the center of the path, and may be positioned at the center of the path of the medium 99 between the feeding unit 15 and the transport unit 14 or closer to the feeding unit 15 (that is, the roll 101) than the center.

Electrical Configuration of Printing Apparatus 11

Next, an electrical configuration of the printing apparatus 11 will be described with reference to FIG. 5.

The printing apparatus 11 includes the control unit 70. A communication unit 71, the operating panel 50, the humidity detector 60, the first pressure sensor 35, the second pressure sensor 45, a first rotary encoder 74, and a second rotary encoder 75 are electrically coupled to the control unit 70. The operating panel 50 includes the display unit 51 and an operation unit 52. In a case in which the display unit 51 is a touch panel, the operation unit 52 may be configured by an operation function portion of the touch panel.

The control unit 70 is communicably coupled to a host device 110 via the communication unit 71. The host device 110 includes a display unit 111 and an operation unit 112 operated by the user. The host device 110 includes a print driver (not illustrated) that generates a print job PJ when a print instruction is received from the user via the operation unit 112. The control unit 70 receives data of the print job PJ from the host device 110 via the communication unit 71. Note that the host device 110 is constituted by, for example, a personal computer (PC), a personal digital assistant (PDA), a tablet PC, a smartphone, or a mobile phone.

The humidity detector 60 detects the humidity outside the housing 12. The humidity detector 60 includes a humidity sensor 61 that detects the relative humidity surrounding the printing apparatus 11 or inside the housing 12, and a temperature sensor 62 that detects the temperature outside the housing 12. The humidity detector 60 calculates an absolute humidity AH according to a predetermined calculation formula using information related to a relative humidity RH (%) detected by the humidity sensor 61 and a temperature T (° C.) detected by the temperature sensor 62. Note that a configuration may be adopted in which the humidity detector 60 includes only the humidity sensor 61. Further, a configuration may be adopted in which the temperature sensor 62 is included instead of the humidity detector 60. Thus, the detector that detects the environment surrounding the printing apparatus 11 need only detect at least one of absolute humidity, relative humidity, and temperature. Note that the control unit 70 may receive the absolute humidity detection value from the humidity detector 60, or may calculate the absolute humidity information on the basis of the relative humidity information and the temperature information received from the humidity detector 60.

The first pressure sensor 35 detects the pressure of the first negative pressure chamber 33 of the suction mechanism 30. The control unit 70 controls a rotational speed of the exhaust fan 34 on the basis of a first pressure value input from the first pressure sensor 35, thereby performing control that brings the negative pressure value inside the first negative pressure chamber 33 close to the target negative pressure value.

The second pressure sensor 45 detects the pressure of the second negative pressure chamber 43 of the suction force applying unit 40. The control unit 70 controls a rotational speed of the exhaust fan 44 on the basis of a second pressure value input from the second pressure sensor 45, thereby performing control that brings a negative pressure value inside the second negative pressure chamber 43 close to the target negative pressure value.

The first rotary encoder 74 detects rotation of the feeding motor 16 constituting the feeding unit 15. That is, the first rotary encoder 74 detects rotation of the roll 101 that rotates by the driving force of the feeding motor 16. The first rotary encoder 74 outputs an encoder signal including several pulses proportional to a rotation amount of the feeding motor 16 to the control unit 70. The control unit 70 detects a feeding amount (feeding volume) of the medium 99 fed from the roll 101 by the feeding unit 15 on the basis of a first encoder signal input from the first rotary encoder 74.

Further, the second rotary encoder 75 detects rotation of the transport motor 72 constituting the transport unit 14. The second rotary encoder 75 outputs an encoder signal including several pulses proportional to a rotation amount of the transport motor 72 to the control unit 70. The control unit 70 detects a transport amount by which the transport roller pair 24 transports the medium 99 on the basis of a second encoder signal input from the second rotary encoder 75.

Further, the feeding motor 16, the transport motor 72, the winding motor 18, the ejecting unit 28, a carriage motor 73, the suction mechanism 30, and the suction force applying unit 40 are electrically coupled to the control unit 70. The transport motor 72 is a driving source of the driving roller 25 constituting the transport unit 14. The carriage motor 73 is a driving source of the carriage 29. Note that the printing apparatus 11 may be a line printer instead of a serial printer and, in this case, a configuration in which the carriage motor 73 is removed from FIG. 5 is adopted.

The print job PJ that the control unit 70 receives from the host device 110 includes various commands required for printing control, printing condition information specified by the user, and print image data. The control unit 70 controls the various motors 16, 18, 72, and the like on the basis of the printing condition information included in the print job PJ, and controls the ejecting unit 28 on the basis of the print image data to eject liquid from the nozzles 28N, thereby drawing an image with dots formed by droplets landing on the medium 99.

Further, the control unit 70 is configured to include a central processing unit (CPU), a read only memory (ROM), a random access memory (RAM), and a storage (not illustrated). The control unit 70 controls transport of the medium 99 in the printing apparatus 11 and a printing operation of printing information onto the medium 99 by the printing unit 27. Specifically, the control unit 70 is not limited to performing software processing for all processing executed by the control unit 70 itself. For example, the control unit 70 may include a dedicated hardware circuit (for example, application specific integrated circuit: ASIC) configured to perform hardware processing of at least a portion of the processing executed by the control unit 70 itself. That is, the control unit 70 may be configured as circuitry including one or more processors that operate according to a computer program (software), one or more dedicated hardware circuits that execute at least some of the various processing, or a combination thereof. A processor includes a CPU and a storage unit 80 such as a RAM and a ROM, and the storage unit 80 stores program code or instructions configured to cause the CPU to execute processing. The storage unit 80, that is, a computer-readable medium, includes any usable medium that can be accessed by a general purpose or dedicated computer.

Figure 5:
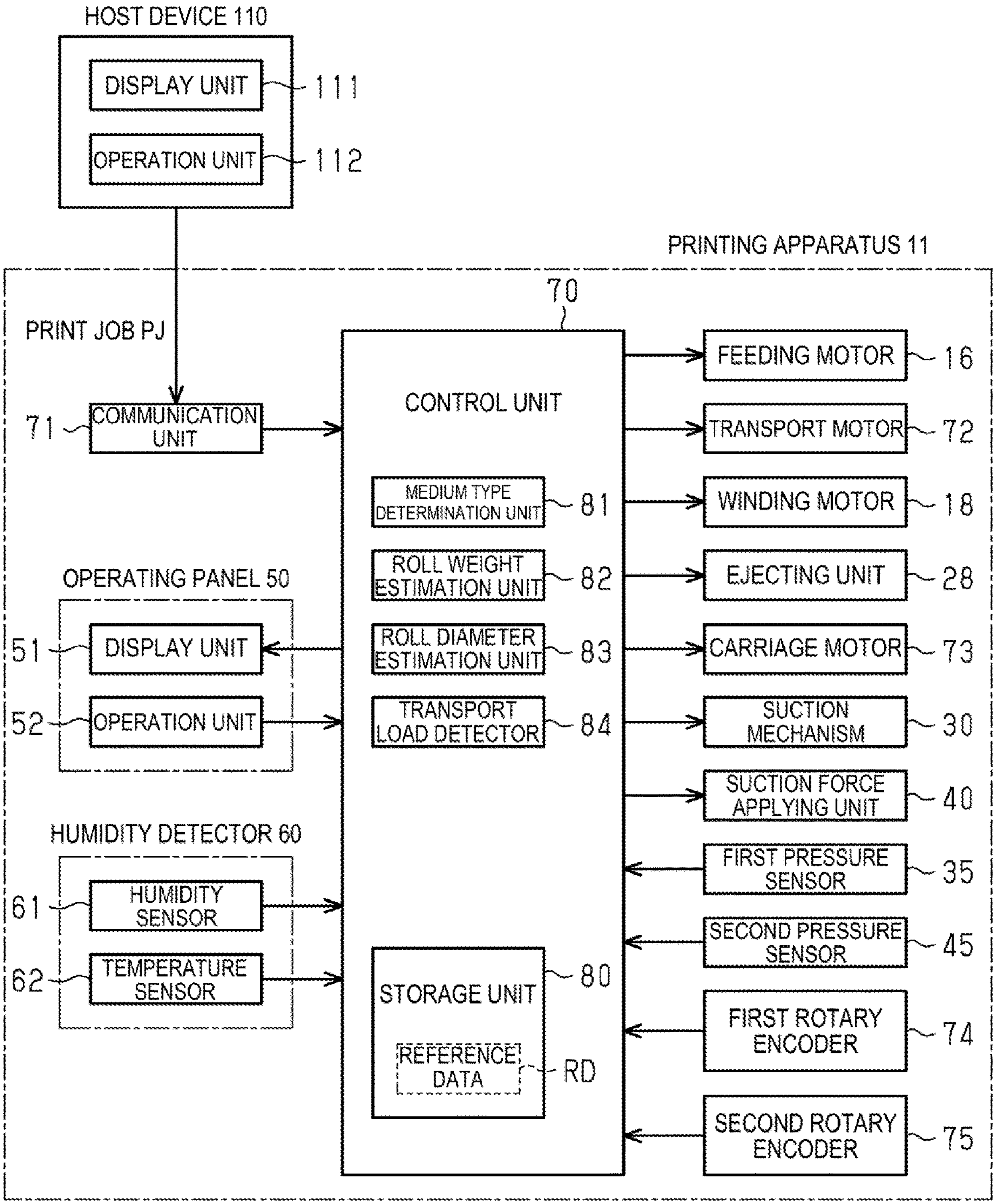
FIG. 5 is a block diagram illustrating an electrical configuration of the printing apparatus.

The CPU of the control unit 70 illustrated in FIG. 5 executes various types of control including printing control by executing a control program stored in the storage unit 80. The storage unit 80 stores this control program as well as reference data RD referenced when the suction force applying unit 40 determines the suction force to be applied to the medium 99.

Further, the control unit 70 includes a medium type determination unit 81, a roll weight estimation unit 82, a roll diameter estimation unit 83, and a transport load detector 84 as functional portions formed of software configured by the CPU executing a program.

The medium type determination unit 81 determines the medium type that is the type of the medium 99. The medium type determination unit 81 determines the medium type on the basis of medium type information in the printing condition information included in the print job PJ. The medium type includes plain paper, glossy paper, matte paper, and the like. Further, the information related to the medium type includes information pertaining to a basis weight related to a medium thickness. Thus, the medium type determination unit 81 determines the medium type by distinguishing between thin paper, thick paper, and the like grouped by medium thickness using the basis weight information without limiting the medium type to types such as plain paper and glossy paper.

The control unit 70 controls the suction force applying unit 40. Specifically, the control unit 70 may control the suction force applying unit 40, thereby applying a suction force to the medium 99, and perform tension control, thereby controlling the feeding unit 15 so as to apply tension to the medium 99 at a portion downstream of the transport unit 14 in the transport direction Y1.

Further, the control unit 70 may control the suction force applying unit 40, thereby applying a suction force to the medium 99, and perform slack control, thereby forming slack in the medium 99 at a portion between the suction force applying unit 40 and the feeding unit 15.

The control unit 70 includes the medium type determination unit 81 as an example of a determination unit that determines the type of the medium 99. The suction force applying unit 40 controlled by the control unit 70 applies a suction force corresponding to the type of the medium 99 (medium type) to the medium 99.

By referring to the reference data RD on the basis of the medium type determined by the medium type determination unit 81, the control unit 70 determines the suction force corresponding to the medium type. The control unit 70 drives and controls the suction force applying unit 40 so that the medium 99 can be suctioned by the determined suction force. Specifically, the control unit 70 controls the rotational speed of the suction fan 44 so that the detected pressure value of the second pressure sensor 45 reaches the target pressure (target negative pressure) to obtain the determined suction force.

The roll weight estimation unit 82 estimates a roll weight that is a weight of the roll 101. An operator inputs a medium type that is the type of the medium 99 and an initial roll diameter of the roll 101. A thickness of the medium 99 is acquired from the information related to the medium type.

Further, a rotation amount of the roll 101 is acquired on the basis of the encoder signal from the first rotary encoder 74 that detects the rotation of the feeding motor 16. The roll weight estimation unit 82 calculates and estimates a roll diameter of the roll 101 from the thickness of the medium 99 and the rotation amount of the roll 101 on the basis of a calculation formula determined from a relationship in which the roll diameter becomes shorter per rotation by a value twice the thickness. Then, because a width dimension of the medium 99 is known, a volume of the roll 101 is calculated, and the roll weight is calculated from the volume and a specific gravity of the medium 99. The control unit 70 controls the suction force of the suction force applying unit 40 according to the weight of the roll 101 estimated by the roll weight estimation unit 82. In this manner, the suction force applying unit 40 applies a suction force corresponding to the weight of the roll 101 to the medium 99.

The roll diameter estimation unit 83 estimates the roll diameter that is a diameter of the roll 101 supported by the feeding unit 15. The roll diameter estimation unit 83 acquires the medium type and the basis weight from the printing condition information of the medium 99. Further, the user operates the operating panel 50 or the operation unit 112 of the host device 110 to input the initial roll diameter when the roll 101 is mounted onto the feeding unit 15. The roll diameter estimation unit 83 acquires a feeding rotation amount of the roll 101 by counting the number of pulse edges of the encoder signal input from the first rotary encoder 74 that detects the rotation of the feeding motor 16. The roll diameter estimation unit 83 estimates the current roll diameter using the initial roll diameter, the feeding rotation amount, and the medium thickness. Note that the roll diameter estimation unit 83 may be configured to include a sensor that measures the roll diameter of the roll 101 mounted onto the feeding unit 15 and measure and estimate the roll diameter on the basis of a detected value of the sensor. The control unit 70 controls the suction force applied to the medium 99 by the suction force applying unit 40 in accordance with the diameter (roll diameter) of the roll 101 estimated by the roll diameter estimation unit 83. In this manner, the suction force applying unit 40 applies a suction force corresponding to the diameter of the roll 101 to the medium 99.

The transport load detector 84 detects a transport load when the transport roller pair 24 transports the medium 99. This transport load is detected as a motor load received by the transport motor 72 that drives the driving roller 25 of the transport roller pair 24. A current value (motor current value) for driving the transport motor 72 is detected, and this current value is detected as the motor load, that is, the transport load.

Note that, after the power is turned on and the medium 99 is set in the transport unit 14, upon receipt of an instruction to start reel measurement, the control unit 70 executes reel measurement. In the reel measurement, a winding load when the medium 99 is wound by the winding unit 17 is measured in a state without tension applied to the medium 99. Then, the control unit 70 adds a torque conversion value of the target tension to be applied to the medium 99 according to the medium type and the medium width to a torque conversion value of the winding load obtained from the measurement result of the reel measurement, and obtains the target rotation torque for control of the winding motor 18. The control unit 70 may apply a front tension that is a tension acting on a region of the medium 99 between the transport unit 14 and the roll 102 during winding by controlling the winding motor 18 with the obtained target rotation torque.

Further, the control unit 70 may apply the back tension BT that acts on the region of the medium 99 between the roll 101 and the transport unit 14 by controlling a transport amount by which the transport unit 14 transports the medium 99 and the feeding amount by which the feeding unit 15 feeds the medium 99 from the roll 101. Specifically, the control unit 70 may apply the back tension BT to the medium 99 by controlling the feeding amount so as to be slightly less than the transport amount, and transporting the medium 99 while causing slight slippage in the roller.

When the humidity is high, the medium 99 absorbs moisture in the atmosphere, and thus increases in moisture content. When the moisture content increases, paper fibers absorb the moisture, the medium 99 becomes soft, and wrinkling readily occurs. Further, the medium 99 after adherence of a liquid such as ink increases in total moisture amount. As a result, due to an increase in an amount of expansion and contraction when the medium 99 swells and contracts, the likelihood of wrinkling increases. Then, when a contraction amount differs between a portion before printing and a portion after printing, wrinkling generated by swelling and contraction of the medium 99 in the printing region, for example, may propagate upstream of the transport roller pair 24. Thus, high humidity readily causes wrinkling in the medium 99. Therefore, in this exemplary embodiment, the humidity surrounding the printing apparatus 11 is detected, and the likelihood of wrinkling of the medium 99 due to humidity is managed.

Then, the control unit 70 controls the suction force applying unit 40 on the basis of information related to the likelihood of wrinkling. Further, the control unit 70 controls the suction force applied to the medium 99 by the suction force applying unit 40 in accordance with the roll weight. Specifically, the control unit 70 controls the suction force applying unit 40 so that the suction force applied to the medium 99 decreases as the roll weight estimated by the roll weight estimation unit 82 increases. In other words, the control unit 70 controls the suction force applying unit 40 so that the suction force applied to the medium 99 increases as the roll weight decreases.

Further, the control unit 70 controls the suction force applied to the medium 99 by the suction force applying unit 40 in accordance with the roll diameter. Given that torque is constant, the tension acting on the medium 99 and the roll diameter are inversely proportional to each other. Therefore, to maintain an appropriate target tension according to the medium type even when the roll diameter changes, it is necessary to control a motor torque according to the roll diameter. Specifically, the control unit 70 controls the feeding motor 16, increasing the motor torque as the roll diameter estimated by the roll diameter estimation unit 83 increases. In other words, the control unit 70 controls the feeding motor 16, decreasing the motor torque as the roll diameter estimated by the roll diameter estimation unit 83 decreases.

Here, when the suction force applied to the medium 99 by the suction force applying unit 40 increases, the drag force that the medium 99 receives from the support face 21A increases, and thus the frictional force fs (refer to FIG. 2) that the medium 99 receives from the support face 21A increases. This frictional force fs increases the back tension BT acting on the portion of the medium 99 upstream of the transport roller pair 24 in the transport direction Y1.

However, when the back tension BT increases, the transport roller pair 24 and the medium 99 readily slip, decreasing transport position accuracy. On the other hand, when the back tension BT is decreased to increase the transport position accuracy, a portion of the medium 99 upstream of the transport roller pair 24 in the transport direction Y1 is likely to float from the support face 21A. This also increases the likelihood of wrinkling in the medium 99. That is, the measure for increasing the transport position accuracy and the measure for suppressing wrinkling are in a trade-off relationship.

Furthermore, the control unit 70 controls the transport motor 72 on the basis of the transport load (motor load) detected by the transport load detector 84. When the transport load detected by the transport load detector 84 increases, the suction force applied to the medium 99 by the suction force application unit 40 is decreased. That is, the transport load of the transport roller pair 24 is decreased by weakening the suction force to decrease the frictional force fs.

Next, the reference data RD will be described with reference to FIG. 6. The reference data RD is, for example, table data indicating a correspondence relationship between the medium type and the suction force. The suction force is set for each medium type. In the example shown in FIG. 6, a medium A is associated with a suction force a, a medium B is associated with a suction force b, and a medium C is associated with a suction force c. The medium types A, B, C, . . . are, for example, plain paper, photographic paper, glossy paper, matte paper, and high-quality paper. The suction forces a, b, c, . . . determine, for example, the rotational speed of the suction fan 44 of the suction force applying unit 40. Note that the reference data RD shown in FIG. 6 may be table data indicating a correspondence relationship between the medium types A, B, C, . . . and rotational speeds Va, Vb, Vc, . . . of the suction fan 44.

The likelihood of wrinkling depends on the thickness (basis weight), rigidity (Young's modulus), environment, and the like of the medium 99.

FIG. 7 is a graph showing the relationship between a nature of the medium type and the suction force. The reference data RD is created so as to satisfy the relationship shown in this graph. In the graph shown in FIG. 7, the horizontal axis represents the likelihood of wrinkling and the vertical axis represents the suction force.

As shown in FIG. 7, the medium 99 differs in the likelihood of wrinkling depending on the medium type. Therefore, the smallest suction force possible within a suction force range capable of wrinkle suppression may be set for each medium type. The reasoning for this is that the transport position accuracy of the medium 99 transported to the printing position facing the ejecting unit 28 during printing decreases when the suction force is strong and the back tension BT is excessively large. As understood from a graph line L1, a large suction force is set for a medium type having a high likelihood of wrinkling, and a small suction force is set for a medium type having a low likelihood of wrinkling. As a result, both an improvement in the transport position accuracy of the medium 99 and a wrinkle suppression effect are achieved. Note that the suction force "0" may be set for a medium type having a low likelihood of wrinkling. That is, there may be a setting for a medium type not subject to suction force.

Next, the control for changing the suction force in accordance with the roll diameter and the roll weight will be described with reference to FIGS. 8 and 9. FIG. 8 is a graph showing the relationship between the roll weight and the suction force. Further, FIG. 9 is a graph showing the relationship between the roll diameter and the suction force.

As indicated by a graph line L2 in FIG. 8, the suction force may be set to a smaller value as the roll weight increases. Initially, when the roll 101 is newly replaced, the roll weight is the largest. As printing proceeds, the roll diameter and the roll weight of the roll 101 gradually decrease. The roll weight of the roll 101 acts to increase the back tension BT on the medium 99. Thus, the suction force applied to the medium 99 to adjust the back tension BT to an appropriate value is set low while the roll weight is large and adjusted to a higher value as the roll weight decreases.

As indicated by a graph line L3 in FIG. 9, the suction force may be set to a lower value as the roll diameter increases. Initially, when the roll 101 is newly replaced, the roll diameter is the largest. As printing proceeds, the roll diameter of the roll 101 gradually decreases. Given that the driving torque of the feeding motor 16 is the same under the same printing conditions such as when the printing mode is the same, an angular acceleration of the roll 101 when the feeding of the medium 99 is started is greater for larger roll diameters. That is, a rotation start delay of the roll 101 increases in likelihood with larger roll diameters. The rotation start delay of the roll 101 applies a force in a direction in which the back tension BT is increased on the medium 99. Under a constant frictional force fs applied to the medium 99 by the suction force of the suction force applying unit 40, the tension of the medium 99 in the path between the transport unit 14 and the roll 101 is basically maintained as long as the transport amount of the transport unit 14 and the feeding amount of the roll 101 are the same. However, because the feeding amount of the medium 99 decreases during the delay occurrence period, the rotation start delay of the roll 101 is likely to increase the back tension BT. Therefore, the control unit 70 decreases the suction force of the suction force applying unit 40 by an amount corresponding to the increase in the back tension BT caused by the rotation start delay of the roll 101. In other words, as indicated by the graph line L3 in FIG. 9, the control unit 70 controls the suction force applying unit 40, increasing the suction force as the roll diameter decreases.

The angular acceleration of the roll 101 depends on an inertia (moment of inertia) of a rotation system of the roll 101 and the feeding unit 15. This inertia depends on the roll diameter (radius), and thus the angular acceleration depends on the roll diameter. That is, the angular acceleration at the start of roll rotation is lower for larger roll diameters. Therefore, while the roll diameter (that is, inertia) is large, the suction force of the suction force applying unit 40 is decreased in consideration of the tension generated as a result of the rotation start delay. Then, as the roll diameter decreases, the tension caused by the rotation start delay also decreases, and thus the suction force of the suction force applying unit 40 is gradually increased. In this way, the control unit 70 controls the suction force of the suction force applying unit 40 in accordance with the roll diameter of the roll 101.

The control unit 70 according to this exemplary embodiment does not control the feeding motor 16 so as to adjust the back tension BT in accordance with the roll weight and the roll diameter of the roll 101. That is, the control unit 70 controls the feeding amount and a feeding velocity of the feeding unit 15 in accordance with the transport amount and a transport velocity of the transport unit 14 so as not to generate excessive tension, but does not perform back tension control (BTC) for adjusting the tension to the target value. The control unit 70 calculates a driving speed and a driving amount of the feeding motor 16 in accordance with changes in the roll weight and the roll diameter of the roll 101 and controls the feeding motor 16 on the basis of these calculated control values so that the feeding velocity and the feeding amount from the roll 101 become respective target values (target speed and target amount). Therefore, the tension of the medium 99 fed from the feeding unit 15 varies within a certain range.

Actions of Exemplary Embodiment

Next, actions of the printing apparatus 11 will be described.

The user operates the operation unit 112 of the host device 110 or the operation unit 52 of the printing apparatus 11 and thus inputs the printing condition information. The printing condition information includes information such as the medium size, the medium type, a printing color (color/monochrome), a printing count (number of print layers), and a printing resolution. Note that the medium type may be input by the user operating the operation unit, or the control unit 70 may acquire the medium type from information included in the printing condition information. Note that the medium types may be general medium types classified by paper quality, such as plain paper or photographic paper, or may be medium types further classified by thickness (basis weight) by adding information related to thickness (basis weight). Further, the printing apparatus 11 may include an imaging unit such as a camera or an image sensor, and the control unit 70 may determine the medium type on the basis of the image of the medium 99 captured by the imaging unit, thereby acquiring the information related to the medium type.

For example, the user sets the medium 99 in the transport unit 14 by mounting a new roll 101 onto the feeding unit 15 and nipping the medium 99 of a predetermined length drawn out from the roll 101 between the transport roller pair 24. Note that, before starting printing, the user operates the operation unit 112 of the host device 110 or the operation unit 52 of the printing apparatus 11 to instruct the control unit 70 to perform reel measurement in advance. In the reel measurement, the control unit 70 measures the motor load when the medium 99 is transported in a state without tension. In this way, the control unit 70 detects the load of the feeding motor 16 and the transport motor 72 when the tension is not applied to the medium 99.

Then, the user operates the operation unit 112 of the host device 110 or the operation unit 52 of the printing apparatus 11 to provide instructions related to the print job PJ. The control unit 70 controls the feeding unit 15, the transport unit 14, the winding unit 17, and the printing unit 27 on the basis of the commands included in the print job PJ, thereby printing characters or images based on the print image data onto the medium 99.

During printing, a suction force is applied to a portion of the medium 99 between the roll 101 and the transport roller pair 24 by the suction force applying unit 40. At the suction location SA, the medium 99 comes into contact with the support face 21A at a surface pressure corresponding to the suction force. Thus, even if floating occurs before the suction location SA is reached, the floating is eliminated by the surface pressure between the medium 99 and the support face 21A. As a result, wrinkling caused by the floating of the medium 99 is suppressed.

Further, the frictional force fs based on the surface pressure corresponding to the suction force occurs between the medium 99 and the support face 21A at the suction location SA. Due to this frictional force fs, the back tension BT acts on a portion of the medium 99 between the suction location SA and the transport roller pair 24.

If wrinkling such as the longitudinal wrinkling occurs in a portion of the medium 99 between the suction location SA and the transport roller pair 24, the medium 99 receiving the back tension BT slides, spreading in the width direction X with respect to the transport roller pair 24, eliminating or reducing the wrinkling such as the longitudinal wrinkling. As a result, it is possible to suppress the occurrence of creases caused by wrinkling being sandwiched by the transport roller pair 24. Thus, an occurrence frequency of printing defects caused by creases is reduced.

Further, due to the effect of the surface pressure corresponding to the suction force, the occurrence of floating is suppressed and the floating that does occur is eliminated. As a result, even if wrinkling occurs, the wrinkling is relatively small. Therefore, the back tension BT required for sliding and thus spreading the medium 99 in the width direction with respect to the transport roller pair 24 to eliminate or reduce wrinkling is relatively small. As a result, it is possible to suppress a slip amount by which the medium 99 slips in the transport direction Y1 with respect to the transport roller pair 24 by the back tension BT. Thus, the transport position accuracy of the medium 99 is improved, improving the print image quality.

Further, the suction force applied to the medium 99 by the suction force applying unit 40 changes in accordance with the medium type on the basis of the reference data RD shown in FIG. 6. As shown in FIG. 7, a relatively large suction force is applied to a medium type having a high likelihood of wrinkling, and a relatively small suction force is applied to a medium type having a low likelihood of wrinkling. In other words, a larger suction force is applied to a first medium type having a high likelihood of wrinkling than to a second medium type having a likelihood of wrinkling lower than that of the first medium type.

Thus, a suction force close to the minimum required for eliminating and reducing wrinkling for each medium type is applied to the medium 99. For example, in a case in which the suction force is constant regardless of medium type, the suction force must be aligned with the medium type having a high likelihood of wrinkling. In this case, an excessive back tension BT due to an excessive suction force is applied to the medium 99 of the medium type having a low likelihood of wrinkling. As a result, the excessive back tension BT may induce unnecessary slipping of the medium 99 with respect to the transport roller pair 24. In this case, there is a possibility that a reduction in transport position accuracy of the medium 99 and a reduction in print image quality will occur.

In the printing apparatus 11 of this exemplary embodiment, the suction force applied to the medium 99 is adjusted to an appropriate value corresponding to the medium type. Thus, a reduction in the transport position accuracy of the medium 99 and a reduction in the print image quality due to excessive back tension BT are suppressed.

Further, the tension transmitted from the roll 101 is blocked at the suction location SA by the frictional force fs occurring at the suction location SA. As a result, the tension from the roll 101 is less likely to affect the portion between the suction location SA and the transport roller pair 24. Thus, the control unit 70 controls the suction force of the suction force applying unit 40, facilitating control of the back tension BT.

For example, the tension that the medium 99 receives from the roll 101 changes due to a change in the weight or the diameter of the roll 101. When this changing tension is propagated downstream of the suction location SA in the transport direction Y1, it becomes difficult to control the back tension BT. However, in the printing apparatus 11 of this exemplary embodiment, the tension from the roll 101 is blocked at the suction location SA, making transmission of the tension downstream of the suction location SA in the transport direction Y1 less likely. Although the tension from the roll 101 readily varies, the tension is readily blocked at the suction location SA, facilitating control of the back tension BT.

However, the tension from the roll 101 is transmitted downstream of the suction location SA at a certain ratio. Therefore, the control unit 70 according to the exemplary embodiment estimates the roll weight of the roll 101 and controls the suction force of the suction force applying unit 40 on the basis of the estimated value. Specifically, the roll weight estimation unit 82 estimates the current roll weight on the basis of the initial roll weight and the feeding amount of the medium 99 from the time point of the initial roll weight to the current time point. While the roll weight is large, the ratio at which the tension caused by the weight of the roll 101 affects the back tension BT is large, and thus the suction force of the suction force applying unit 40 is adjusted to a smaller value corresponding to the ratio. Then, as the estimated roll weight decreases, the ratio at which the tension caused by the roll weight affects the back tension BT gradually decreases, and thus the control unit 70 gradually adjusts the suction force of the suction force applying unit 40 to a large value.

Further, the roll diameter estimation unit 83 estimates the current roll diameter on the basis of the initial roll diameter and the feeding amount of the medium 99 from the time point of the initial roll diameter to the current time point. While the roll diameter is large, the inertia of the rotation system including the roll 101 is large, and thus a rotation start delay of the roll 101 is likely to occur. The rotation start delay of the roll 101 makes excessive tension from the roll 101 more likely.

The control unit 70 controls the rotational speed and the rotation amount of the roll 101 based on the detection signal of the first rotary encoder 74 and the transport velocity and the transport amount of the transport roller pair 24 based on the detection signal of the second rotary encoder 75. As a result, control in which excessive tension is not generated between the roll 101 and the transport roller pair 24 is performed. However, while the diameter of the roll 101 is large, the ratio at which the tension from the roll 101 caused by the rotation start delay of the roll 101 affects the back tension BT increases. The control unit 70 controls the suction force of the suction force applying unit 40 according to this ratio. Specifically, as shown in FIG. 9, the control unit 70 decreases the suction force of the suction force applying unit 40 while the roll diameter is large, and increases the suction force of the suction force applying unit 40 as the roll diameter decreases. As a result, the adverse effects of the tension caused by the rotation start delay of the roll 101 on the back tension BT are avoided.

Further, in the printing apparatus 11 illustrated in FIG. 5, the transport load detector 84 detects the load (transport load) of the transport motor 72. The control unit 70 performs feedback control on the suction force of the suction force applying unit 40, bringing the detected actual transport load closer to the target transport load. That is, when the actual transport load is larger than the target transport load, the suction force of the suction force applying unit 40 is changed to a small value. On the other hand, when the actual transport load is smaller than the target transport load, the suction force of the suction force applying unit 40 is changed to a large value. In this way, the actual transport load of the transport motor 72 is brought closer to the target transport load. As a result, even if there is variation or the like in the back tension BT, the medium 99 is transported with a substantially constant transport load by the transport roller pair 24. As a result, high transport position accuracy of the medium 99 is maintained.

In the related art, in a printing apparatus having a configuration including an intermediate roller, it is necessary for the user to move the intermediate roller when setting the medium 99 or when a jam occurs, reducing workability. Further, a mechanism for moving the intermediate roller is required and, if that mechanism is heavy, it is necessary to increase the rigidity of the apparatus frame supporting the mechanism. This readily increases the size of the printing apparatus.

In contrast, in the printing apparatus 11 according to this exemplary embodiment, there is no intermediate roller that interferes with tasks, and thus the setting task of the medium 99 and the medium removal task when a jam occurs are easily completed. Moreover, there is no need for a mechanism that moves the intermediate roller and substantially no need to increase the rigidity of the equipment frame supporting such a mechanism. Further, the suction force applying unit 40 can be disposed in an empty space on a lower side of the support portion 21 forming the transport path. Therefore, the printing apparatus 11 according to this exemplary embodiment can both ensure workability and achieve a simple configuration.

Effects of Exemplary Embodiment

Effects of the exemplary embodiment will now be described.

(1) The printing apparatus 11 includes the transport unit 14, the printing unit 27, the support portion 21, and the suction force applying unit 40. The support portion 21 includes the support face 21A configured to support the printing medium 99 at a position upstream of the transport unit 14 in the transport direction Y1 in which the transport unit 14 transports the printing medium 99. The suction force applying unit 40 is configured to apply, to the printing medium 99 transported along the support face 21A, a suction force attracting the printing medium 99 to the support face 21A, thereby generating a surface pressure based on the suction force between the printing medium 99 and the support face 21A. According to this configuration, from the frictional force fs generated by the surface pressure based on the suction force between the printing medium 99 transported and the support face 21A, it is possible to apply tension to the portion of the printing medium 99 between the suction location SA and the transport unit 14. This makes it possible to suppress wrinkling of the printing medium 99 before being fed to the transport unit 14 without impairing workability and with a relatively simple configuration.

(2) The support portion 21 includes the suction hole 42. The suction force applying unit 40 includes the suction fan 44 that generates a negative pressure in the suction hole 42. According to this configuration, it is possible to generate a surface pressure based on the suction force between the printing medium 99 and the support face 21A by the suction force caused by the negative pressure generated in the suction hole 42.

(3) The support face 21A of the support portion 21 is a curved surface. According to this configuration, because the support face 21A of the support portion 21 is a curved surface (arc shape), floating of the suctioned printing medium 99 can be effectively eliminated. This makes it possible to suppress wrinkling of the printing medium 99.

(4) The feeding unit 15 configured to support the roll 101 around which the printing medium 99 is wound into a roll shape at a position upstream of the transport unit 14 in the transport direction Y1, and feed the printing medium 99 from the roll 101 is provided. The feeding unit 15 is positioned below the transport unit 14 and the support portion 21 in the vertical direction Z. According to this configuration, the printing medium 99 can be pressed onto the curved surface by the weight of the roll 101. Thus, floating is less likely to occur in the printing medium 99 compared to with a flat surface.

(5) The suction hole 42 opens at the support face 21A or opens at the bottom face of the groove 21B recessed in the support face 21A. According to this configuration, it is possible to efficiently suction the printing medium 99.

(6) The suction hole 42 or the groove 21B is positioned closer to the transport unit 14 than the center of the path of the printing medium 99 between the feeding unit 15 and the transport unit 14 in the transport direction Y1. According to this configuration, because the suction hole 42 or the groove 21B is positioned closer to the transport unit 14 than the feeding unit 15, the occurrence of a crease caused by a wrinkle being transported into the transport unit 14 is readily suppressed.

(7) The control unit 70 includes the medium type determination unit 81 that determines the type of the printing medium 99. The suction force applying unit 40 applies the suction force corresponding to the type (medium type) of the printing medium 99 determined by the medium type determination unit 81 to the printing medium 99. According to this configuration, it is possible to apply an appropriate tension corresponding to the type of the printing medium 99 to the printing medium 99. This makes it possible to suppress floating and wrinkling without applying an excessive suction force to the printing medium 99.

(8) The control unit 70 that controls the suction force applying unit 40 is provided. The control unit 70 controls the suction force applying unit 40, applying the suction force to the printing medium 99, and performs slack control, forming slack in the printing medium 99 at a portion between the suction force applying unit 40 and the feeding unit 15. According to this configuration, it is possible to apply more appropriate tension to the printing medium 99. Thus, floating and wrinkling are less likely to occur in the printing medium 99.

(9) The printing apparatus 11 includes the roll weight estimation unit 82 that estimates the weight of the roll 101. The suction force applying unit 40 applies a suction force corresponding to the weight of the roll 101 to the printing medium 99. According to this configuration, even when the weight of the roll 101 changes, it is possible to apply an appropriate tension to the printing medium 99. Thus, floating and wrinkling are less likely to occur in the printing medium 99.

(10) The printing apparatus 11 includes the roll diameter estimation unit 83 that estimates the diameter of the roll 101. The suction force applying unit 40 applies a suction force corresponding to the diameter of the roll 101 to the printing medium 99. According to this configuration, even when the diameter of the roll 101 changes, it is possible to apply an appropriate tension to the printing medium 99. Thus, floating and wrinkling are less likely to occur in the printing medium 99.

This exemplary embodiment can be modified and implemented as follows. The exemplary embodiment and the following modified examples can be combined and implemented within a technically consistent range.

Figure 10:
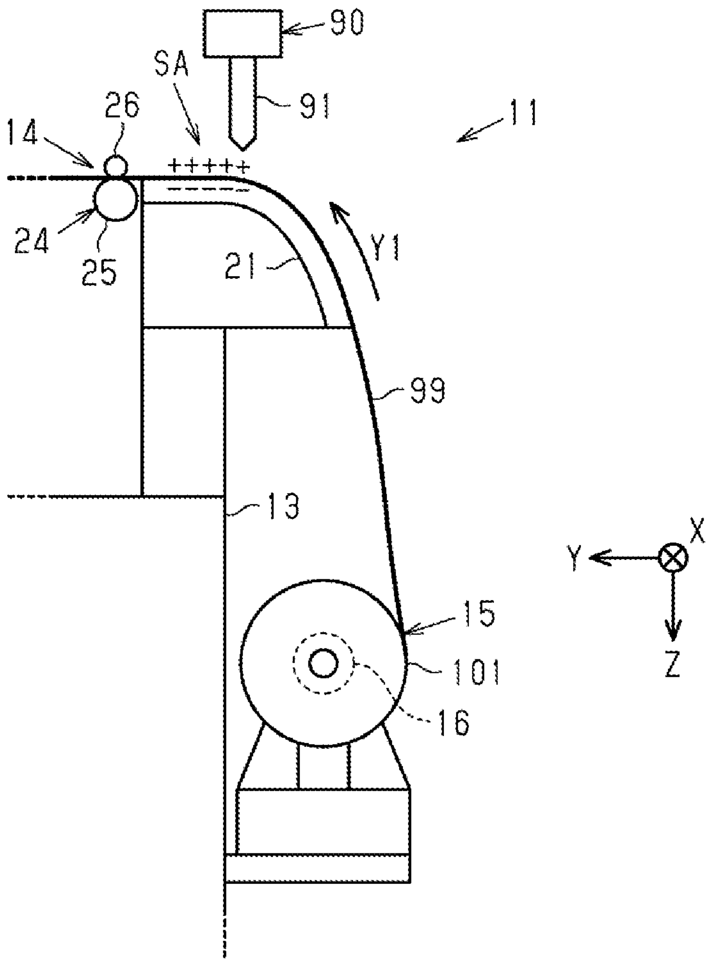
FIG. 10 is a schematic side sectional view illustrating a portion of a printing apparatus including a suction force applying unit according to a modified example.

The suction force applying unit 40 is not limited to a configuration that applies a suction force by a suction airflow that suctions air by negative pressure. The suction force applying unit 40 may be, for example, a static electricity generation unit 90 illustrated in FIG. 10. The static electricity generation unit 90 applies a suction force by static electricity to the printing medium 99. The static electricity generation unit 90 includes a charging unit 91 that charges the printing medium 99 supported by the support portion 21. In the example illustrated in FIG. 10, the charging unit 91 is positioned close to a front face of the printing medium 99, which is the face opposite to the supported face (back face). The charging unit 91 charges the printing medium 99 with, for example, a positive charge. The support portion 21 that supports the printing medium 99 is negatively charged, and the printing medium 99 that is positively charged is attracted to the support face 21A of the support portion 21 by a suction force (Coulomb force) based on static electricity. The control unit 70 controls the static electricity generation unit 90, thereby charging the printing medium 99 with a charge amount corresponding to the medium type that is the type of the printing medium 99. In this way, the control unit 70 controls the suction force (Coulomb force) acting between the printing medium 99 and the support face 21A for each medium type. Then, the back tension BT can be applied to a portion of the printing medium 99 upstream of the transport roller pair 24 in the transport direction Y1 by the frictional force fs acting in the reverse transport direction −Y1 by the surface pressure based on the suction force by the static electricity. That is, it is possible to apply the back tension BT at a strength corresponding to the medium type to the printing medium 99. As a result, wrinkling of the printing medium 99 is suppressed and, even if wrinkling does occur, the wrinkling can be eliminated before transport into the transport roller pair 24. This makes it possible to suppress creases caused by wrinkles sandwiched between the transport roller pair 24. Furthermore, because the back tension is adjusted to an appropriate value in accordance with the medium type, it is possible to suppress slipping of the printing medium 99 in the transport roller pair 24. This makes it possible to increase the transport position accuracy of the printing medium 99 and thus improve the print quality.

Figure 11:
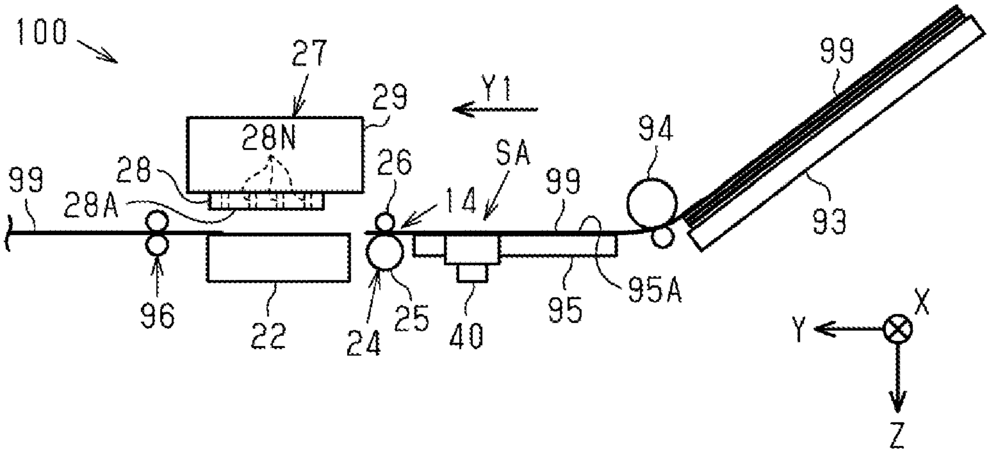
FIG. 11 is a schematic side sectional view illustrating a printing apparatus according to a modified example.

As illustrated in FIG. 11, a printing apparatus 100 that performs printing on the printing medium 99 that is cut paper may be used. The printing apparatus 100 includes a placement unit 93 on which the printing medium 99 is placed, a feeding roller 94 that feeds the printing medium 99 placed on the placement unit 93, and a support portion 95 having a support face 95A that supports the fed printing medium 99. The transport roller pair 24 constituting the transport unit 14 is positioned downstream of the feeding roller 94 in the transport direction Y1. A portion of the printing medium 99 between the feeding roller 94 and the transport roller pair 24 is supported by the support face 95A. The suction force applying unit 40 that applies suction force to the printing medium 99 is disposed in a region upstream of the transport roller pair 24 and downstream of the feeding roller 94 in the transport direction Y1. The suction force applying unit 40 applies, to the printing medium 99, a suction force that attracts the transported printing medium 99 to the support face 95A. The support face 95A of the support portion 95 is a flat surface. In the example illustrated in FIG. 11, the support face 95A is a flat surface extending horizontally. Downstream of the transport roller pair 24 in the transport direction Y1 are provided the support 22 that supports the printing medium 99 at a printing position facing the ejecting unit 28 during printing, and a discharge roller pair 96 that discharges the printing medium 99 at a position downstream of the support 22 in the transport direction Y1.

In a case in which the printing apparatus 11 is a serial printer, the control unit 70 may adjust the suction force to different values when the printing medium 99 is being transported and when the printing medium 99 is stopped. For example, the suction force when the printing medium 99 is transported may be weaker than the suction force when the printing medium 99 is stopped. According to this configuration, it is possible to suppress positional deviation of the printing medium 99 caused by an external force or the like during the printing performed while the printing medium 99 is stopped, which leads to an improvement in printing position accuracy.

Slack control for forming slack in a portion of the printing medium 99 fed from the roll 101 may be performed. That is, the control unit 70 controls the feeding motor 16 so as to form slack in the portion of the printing medium 99 between the suction location SA and the roll 101. Specifically, the control unit 70 controls the feeding unit 15, thereby performing slack control for forming slack in the printing medium 99 fed from the roll 101. At the same time, the control unit 70 controls the suction force applying unit 40, thereby controlling the tension of the portion of the printing medium 99 between the transport unit 14 and the suction force applying unit 40 by the frictional force fs corresponding to the surface pressure based on the suction force. The control unit 70 manages the transport amount of the transport unit 14 acquired on the basis of the detection signal of the first rotary encoder 74 and the feeding amount of the feeding unit 15 acquired on the basis of the detection signal of the second rotary encoder 75. Then, the control unit 70 controls the feeding motor 16 so that slack is formed in the printing medium 99 on the basis of the information of the transport amount and the feeding amount. According to this configuration, it is possible to apply an appropriate tension to the portion of the printing medium 99 between the suction location SA and the transport unit 14 without significant effects by the feeding operation of the feeding unit 15.

The control unit 70 may control the feeding motor 16 so that a feeding torque when the printing medium 99 is fed from the roll 101 in accordance with the roll diameter is constant. A torque (feeding torque) required for the feeding motor 16 to feed the printing medium 99 at a constant angular acceleration is proportional to a product of the inertia of the rotation system of the roll 101 and the feeding unit 15 and a roll diameter (radius). Therefore, while the roll diameter is large and the inertia of the rotation system including the roll 101 is large, a current value of the feeding motor 16 is increased by a corresponding increment value. On the other hand, as the roll diameter decreases and the inertia of the rotation system including the roll 101 decreases, the current value of the feeding motor 16 is decreased by a corresponding decrement value. Accordingly, because the feeding torque at which the printing medium 99 is fed from the roll 101 approaches a constant value, the back tension BT adjusted by the suction force applying unit 40 is stabilized. Note that, in this control, an estimated value of the roll weight may be used instead of the roll diameter. The roll diameter and the roll weight have a constant relationship and thus, for example, the graph line L3 shown in FIG. 9 may be converted into a graph line indicating the relationship between the roll weight and the suction force, and the suction force of the suction force applying unit 40 may be controlled in accordance with the graph line after conversion.

In the exemplary embodiment described above, in the configuration in which the back tension control (BTC) is performed using the suction force applying unit 40, the back tension control (BTC) may be further performed using the feeding motor 16. Note that the BTC using the feeding motor 16 described herein is control for adjusting the back tension BT to an appropriate value by control of the feeding motor 16. Depending on a model of the printing apparatus 11, the printing conditions, and the medium type, in a case in which there is a limit by which an appropriate back tension BT cannot be obtained by control of the suction force applying unit 40 alone, an insufficiency exceeding the limit is compensated by BTC using the feeding motor 16. In other words, the control unit 70 controls the feeding unit 15 so as to apply tension to the printing medium 99 fed from the roll 101. At the same time, the control unit 70 controls the suction force applying unit 40, thereby controlling the tension of the portion of the printing medium 99 between the transport unit 14 and the suction force applying unit 40 by the frictional force fs corresponding to the surface pressure based on the suction force. Accordingly, although the control unit 70 performs one more control for the feeding motor 16, it is possible to apply the appropriate back tension BT to the portion of the transported printing medium 99 between the suction location SA and the transport unit 14 compared to a case in which BTC is performed only by the suction force applying unit 40. That is, by utilizing the tension of the printing medium 99 when fed by the feeding unit 15, it is possible to apply the appropriate back tension BT to the portion of the printing medium 99 between the suction location SA and the transport unit 14.

In the exemplary embodiment described above, feedback control (TFB control) for adjusting the suction force so that the detected actual transport load approaches the target transport load is performed on the suction force applying unit 40. However, feedback control (TFB control) may be performed on the transport motor 72. That is, the control unit 70 controls a current value of the transport motor 72 so that the actual transport load detected by the transport load detector 84 approaches the target transport load. Note that, in addition to the TFB control on the suction force applying unit 40, TFB control on the transport motor 72 may be performed, or the TFB control on the transport motor 72 may be performed instead of the TFB control on the suction force applying unit 40. In particular, in the former case, it is possible to adjust the back tension BT acting on the portion of the printing medium 99 upstream of the transport unit 14 in the transport direction Y1 to a more appropriate value.

In the exemplary embodiment described above, the suction force of the suction force applying unit 40 is changed in accordance with the medium type. However, a constant suction force may be applied to the printing medium 99 regardless of the medium type. Even with this configuration, it is possible to obtain the effect of suppressing floating and wrinkling and the effect of eliminating and reducing wrinkling by applying the back tension BT without impairing the workability and with a relatively simple configuration.

In the exemplary embodiment described above, the suction force of the suction force applying unit 40 is changed in accordance with the roll weight, the roll diameter, the transport load, and the like. However, a constant suction force may be applied to the printing medium 99 regardless of these factors. Even with this configuration, it is possible to obtain the effect of suppressing floating and wrinkling and the effect of eliminating and reducing wrinkling by applying the back tension BT without impairing the workability and with a relatively simple configuration.

In the exemplary embodiment described above, a configuration may be adopted in which the support 22 does not include the suction mechanism 30. That is, the support 22 may be configured to support the printing medium 99 at the support face 22A without the suction hole 32.

The suction force applying unit 40 is not limited to a configuration in which a suction force is applied to the printing medium 99 by an air suction force or an electrostatic force, and may generate a suction force using another principle. For example, a configuration may be adopted in which a magnetic force is used to apply a suction force to the printing medium 99. For example, the printing medium 99, upon being magnetized, may be adsorbed by the support portions 21, 95 by a suction force based on magnetic force.

The suction hole 42 is not limited to a circular hole and may be an elongated hole. For example, the elongated hole may extend in the width direction X or may extend in the transport direction Y1. Furthermore, the elongated hole may extend in an oblique direction having components in the two directions of the width direction X and the transport direction Y1.

The configuration is not limited to the configuration of the plurality of suction holes 42 being disposed in one row in the width direction X, and a configuration may be adopted in which the plurality of suction holes 42 are disposed in one row in the transport direction Y1. In this case, a plurality of rows of the suction holes 42 in the transport direction Y1 may be disposed in the width direction X.

The support face 21A of the support portion 21 may be a horizontal surface. Further, the support face 21A of the support portion 21 that supports the printing medium 99 below the roll 101 positioned above the transport unit 14 in the vertical direction Z may be a downwardly convex curved surface. As in the exemplary embodiment described above, the support face 21A serving as the path of the printing medium 99 is formed as an upwardly convex curved surface, making it possible to utilize the surface pressure caused by the dead weight of the printing medium 99 to readily eliminate floating. On the other hand, in the configuration including the suction force applying unit 40, there is no great need to devise a path shape for preventing floating, and thus a degree of freedom of the path shape is increased. Thus, the path of the support portion 21 may be changed to a desired surface shape.

In a case in which a transport region determined by the width size of the printing medium 99 is shorter than an arrangement region of the suction holes 42 or the groove 21B in the width direction X, a mechanism may be provided that blocks the locations of the suction holes 42 or the groove 21B not blocked by the printing medium 99. As the blocking mechanism, a configuration may be adopted in which, for example, an openable lid member that opens and closes the suction holes 42 is provided, and the lid member is moved to an open position to open the suction holes 42, and the lid member is moved to a closed position to close the suction holes 42. For example, a configuration may be adopted in which a plurality of pairs of lid members including a pair of first lid members that block the outermost suction holes in the width direction X and a pair of second lid members that block the second outermost suction holes are provided, and one or a plurality of the pairs of lid members in positions corresponding to the suction holes 42 that cannot be blocked by the printing medium 99 may be closed in accordance with the medium size.

The printing apparatus 11 is not limited to a serial printer and may be a line printer or a page printer. In a case in which the printing apparatus 11 is a line printer, the printing unit 27 does not include the carriage 29, and includes a printing head capable of simultaneously printing a range longer than the maximum width of the printing medium 99. The printing head performs printing on the printing medium 99 transported at a predetermined velocity by the transport unit 14. In this case, the printing head may be an ejecting head (ejecting unit) that ejects liquid such as ink.

The printing apparatus 11 is not limited to an inkjet printer and may be an electrophotographic printer such as a laser printer. Further, the printing apparatus 11 may be a dot impact-type printer or a thermal transfer printer.

The printing apparatus 11 may be an textile printing apparatus of an inkjet type or may be a textile printing apparatus of another printing type.

The printing apparatus 11 may include an image scanning unit (scanner). When the printing apparatus 11 includes an image scanning unit, the printing apparatus 11 may be a multifunction device.

Hereinafter, technical concepts and effects thereof that are introduced from the above exemplary embodiments and modified examples will be described.

(A) A printing apparatus includes a transport unit, a printing unit, a support portion, and a suction force applying unit. The transport unit is configured to apply a transport force to a printing medium and transport the printing medium. The printing unit is configured to perform printing on the printing medium transported. The support portion includes a support face configured to support the printing medium at a position upstream of the transport unit in a transport direction in which the transport unit transports the printing medium. The suction force applying unit is configured to apply, to the printing medium transported along the support face, a suction force attracting the printing medium to the support face, thereby generating a surface pressure based on the suction force between the printing medium and the support face.

According to this configuration, the surface pressure based on the suction force is generated between the printing medium transported and the support face. From a frictional force caused by the surface pressure between the printing medium and the support face, tension can be applied to a portion of the printing medium between the suction location and the transport unit. This makes it possible to suppress wrinkling of the printing medium before transport to the transport unit without impairing workability and with a relatively simple configuration.

(B) In the printing apparatus described above, the support portion may include a suction hole and the suction force applying unit may include a suction fan configured to generate a negative pressure in the suction hole.

According to this configuration, it is possible to generate a surface pressure based on the suction force between the printing medium and the support face by the suction force caused by the negative pressure generated in the suction hole.

(C) In the printing apparatus described above, the support face of the support portion may be a curved surface or a flat surface.

According to this configuration, because the support face of the support portion is a curved surface (arc shape) or a flat surface, floating of the suctioned printing medium can be effectively eliminated. This makes it possible to suppress wrinkling of the printing medium.

(D) The printing apparatus described above may include a feeding unit configured to support a roll obtained by winding the printing medium into a roll shape at a position upstream of the transport unit in the transport direction and feed the printing medium from the roll, and the feeding unit may be positioned below the transport unit and the support portion in a vertical direction.

According to this configuration, the printing medium can be pressed onto the curved surface by the weight of the roll. Thus, floating and wrinkling are less likely to occur in the printing medium compared to with a flat surface.

(E) In the printing apparatus described above, the suction hole may open to the support face or open to a bottom face of a groove recessed in the support face.

According to this configuration, it is possible to efficiently suction the printing medium.

(F) The printing apparatus described above may include a feeding unit configured to support a roll obtained by winding the printing medium into a roll shape at a position upstream of the transport unit in the transport direction and feed the printing medium from the roll, and the suction hole or the groove may be positioned closer to the transport unit than a center of a path of the printing medium between the feeding unit and the transport unit in the transport direction.

According to this configuration, because the suction hole or the groove is positioned closer to the transport unit than the feeding unit, the occurrence of a crease caused by a wrinkle being transported into the transport unit 14 is readily suppressed.

(G) The printing apparatus described above may include a determination unit configured to determine a type of the printing medium, and the suction force applying unit may apply, the suction force corresponding to the type of the printing medium to the printing medium.

According to this configuration, it is possible to apply an appropriate tension corresponding to the type of the printing medium to the printing medium. Thus, floating and wrinkling are less likely to occur in the printing medium.

(H) The printing apparatus described above may further include a control unit, and the control unit may be configured to control the feeding unit to apply tension to the printing medium fed from the roll, and control the suction force applying unit to control a tension of a portion of the printing medium between the transport unit and the suction force applying unit by a frictional force corresponding to the surface pressure based on the suction force.

According to this configuration, by utilizing the tension of the printing medium when fed by the feeding unit, it is possible to apply an appropriate tension to a portion of the printing medium between the suction location and the transport unit.

(I) The printing apparatus described above may further include a control unit, and the control unit may be configured to control the feeding unit to perform slack control for forming slack in the printing medium fed from the roll, and control the suction force applying unit to control a tension of a portion of the printing medium between the transport unit and the suction force applying unit by a frictional force corresponding to the surface pressure based on the suction force.

According to this configuration, it is possible to apply an appropriate tension to the portion of the printing medium between the suction location and the transport unit without significant effects by the feeding operation of the feeding unit.

(J) In the printing apparatus described above, the suction force applying unit may be a static electricity generation unit configured to apply the suction force by static electricity to the printing medium.

According to this configuration, it is possible to utilize static electricity to apply the suction force for bringing the printing medium into contact with the support portion.

(K) The printing apparatus described above may include a roll weight estimation unit configured to estimate a weight of the roll, and the suction force applying unit may be configured to apply a suction force corresponding to the weight of the roll to the printing medium.

According to this configuration, even when the weight of the roll changes, it is possible to apply an appropriate tension to the printing medium. Thus, floating and wrinkling are less likely to occur in the printing medium.

(L) The printing apparatus described above may include a roll diameter estimation unit configured to estimate a diameter of the roll, and the suction force applying unit may be configured to apply a suction force corresponding to the diameter of the roll to the printing medium.

According to this configuration, even when the diameter of the roll changes, it is possible to apply an appropriate tension to the printing medium. Thus, floating and wrinkling are less likely to occur in the printing medium.

What is claimed is:

1. A printing apparatus comprising:

a transport unit configured to apply a transport force to a printing medium and transport the printing medium;

a printing unit configured to perform printing on the printing medium transported;

a support portion including a support face configured to support the printing medium at a position upstream of the transport unit a transport direction in which the transport unit transports the printing medium; and a suction force applying unit configured to apply, to the printing medium transported along the support face, a suction force attracting the printing medium to the support face, thereby generating a surface pressure based on the suction force between the printing medium and the support face, wherein both the support portion and the suction force apply unit are upstream of the transport unit and the printing unit in the transport direction in which the transport unit transports the printing medium.

2. The printing apparatus according to claim 1, wherein the support portion includes a suction hole and the suction force applying unit includes a suction fan configured to generate a negative pressure in the suction hole.

3. The printing apparatus according to claim 2, wherein the suction hole opens at the support face or opens at a bottom face of a groove recessed in the support face.

4. The printing apparatus according to claim 3, comprising:

a feeding unit configured to support a roll obtained by winding the printing medium into a roll shape at a position upstream of the transport unit in the transport direction and feed the printing medium from the roll, wherein the suction hole or the groove is positioned closer to the transport unit than a center of a path of the printing medium between the feeding unit and the transport unit in the transport direction.

5. The printing apparatus according to claim 4, further comprising a control unit, wherein the control unit is configured to control the feeding unit to apply tension to the printing medium fed from the roll, and control the suction force applying unit to control a tension of a portion of the printing medium between the transport unit and the suction force applying unit by a frictional force corresponding to the surface pressure based on the suction force.

6. The printing apparatus according to claim 4, further comprising a control unit, wherein the control unit is configured to control the feeding unit to perform slack control for forming slack in the printing medium fed from the roll, and control the suction force applying unit to control the tension of a portion of the printing medium between the transport unit and the suction force applying unit by a frictional force corresponding to the surface pressure based on the suction force.

7. The printing apparatus according to claim 4, comprising a roll weight estimation unit configured to estimate a weight of the roll, wherein the suction force applying unit is configured to apply a suction force corresponding to a weight of the roll to the printing medium.

8. The printing apparatus according to claim 4, comprising:

a roll diameter estimation unit configured to estimate a diameter of the roll, wherein the suction force applying unit is configured to apply a suction force corresponding to the diameter of the roll to the printing medium.

9. The printing apparatus according to claim 1, wherein the support face of the support portion is a curved surface or a flat surface.

10. The printing apparatus according to claim 1, comprising:

a feeding unit configured to support a roll obtained by winding the printing medium into a roll shape at a position upstream of the transport unit in the transport direction and feed the printing medium from the roll, wherein the feeding unit is positioned below the transport unit and the support portion in a vertical direction.

11. The printing apparatus according to claim 10, further comprising:

a control unit, wherein the control unit is configured to control the feeding unit to apply tension to the printing medium fed from the roll, and control the suction force applying unit to control a tension of a portion of the printing medium between the transport unit and the suction force applying unit by a frictional force corresponding to the surface pressure based on the suction force.

12. The printing apparatus according to claim 10, further comprising a control unit, wherein the control unit is configured to control the feeding unit to perform slack control for forming slack in the printing medium fed from the roll, and control the suction force applying unit to control a tension of a portion of the printing medium between the transport unit and the suction force applying unit by a frictional force corresponding to the surface pressure based on the suction force.

13. The printing apparatus according to claim 10, comprising:

a roll weight estimation unit configured to estimate a weight of the roll, wherein the suction force applying unit is configured to apply a suction force corresponding to the weight of the roll to the printing medium.

14. The printing apparatus according to claim 10, comprising:

a roll diameter estimation unit configured to estimate a diameter of the roll, wherein the suction force applying unit is configured to apply a suction force corresponding to the diameter of the roll to the printing medium.

15. The printing apparatus according to claim 1, comprising:

a determination unit configured to determine a type of the printing medium, wherein the suction force applying unit applies the suction force corresponding to the type of the printing medium to the printing medium.

16. The printing apparatus according to claim 1, wherein the suction force applying unit is a static electricity generation unit configured to apply a suction force by static electricity to the printing medium.

17. A printing apparatus comprising:

a transport unit configured to apply a transport force to a printing medium and transport the printing medium;

a printing unit configured to perform printing on the printing medium transported;

a support portion including a support face configured to support the printing medium at a position upstream of the transport unit in a transport direction in which the transport unit transports the printing medium;

a suction force applying unit configured to apply, to the printing medium transported along the support face, a suction force attracting the printing medium to the support face, thereby generating a surface pressure based on the suction force between the printing medium and the support face;

a feeding unit configured to support a roll obtained by winding the printing medium into a roll shape at a position upstream of the transport unit in the transport direction and feed the printing medium from the roll; and a control unit, wherein the control unit is configured to control the feeding unit to apply tension to the printing medium fed from the roll, and control the suction force applying unit to control a tension of a portion of the printing medium between the transport unit and the suction force applying unit by a frictional force corresponding to the surface pressure based on the suction force, and the feeding unit is positioned below the transport unit and the support portion in a vertical direction.

18. A printing apparatus comprising:

a transport unit configured to apply a transport force to a printing medium and transport the printing medium;

a printing unit configured to perform printing on the printing medium transported;

a support portion including a support face configured to support the printing medium at a position upstream of the transport unit in a transport direction in which the transport unit transports the printing medium;

a suction force applying unit configured to apply, to the printing medium transported along the support face, a suction force attracting the printing medium to the support face, thereby generating a surface pressure based on the suction force between the printing medium and the support face;

a feeding unit configured to support a roll obtained by winding the printing medium into a roll shape at a position upstream of the transport unit in the transport direction and feed the printing medium from the roll; and a control unit, wherein the control unit is configured to control the feeding unit to perform slack control for forming slack in the printing medium fed from the roll, and control the suction force applying unit to control a tension of a portion of the printing medium between the transport unit and the suction force applying unit by a frictional force corresponding to the surface pressure based on the suction force, and the feeding unit is positioned below the transport unit and the support portion in a vertical direction.

* * * * *